US008366548B2

(12) United States Patent
Haruki et al.

(10) Patent No.: US 8,366,548 B2
(45) Date of Patent: Feb. 5, 2013

(54) STORAGE MEDIUM STORING INFORMATION PROCESSING PROGRAM, INFORMATION PROCESSING APPARATUS, INFORMATION PROCESSING METHOD AND INFORMATION PROCESSING SYSTEM

(75) Inventors: Yutaka Haruki, Kyoto (JP); Yusuke Akifusa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 105 days.

(21) Appl. No.: 13/024,620

(22) Filed: Feb. 10, 2011

(65) Prior Publication Data
US 2012/0142434 A1 Jun. 7, 2012

(30) Foreign Application Priority Data

Dec. 6, 2010 (JP) ................................. 2010-271921

(51) Int. Cl.
*A63F 9/24* (2006.01)
(52) U.S. Cl. .......................................... 463/37; 463/42
(58) Field of Classification Search .................... 463/42, 463/37
See application file for complete search history.

(56) References Cited

FOREIGN PATENT DOCUMENTS
JP 2001-745 1/2001

*Primary Examiner* — Omkar Deodhar
(74) *Attorney, Agent, or Firm* — Nixon & Vanderhye P.C.

(57) ABSTRACT

A game apparatus includes a CPU and a main memory. The main memory stores a first character, is capable of storing a second character, and stores a first movement history being brought into association with the first character. The CPU acquires position information indicating a position in which the game apparatus exists, updates a first movement history on the basis of the position information, receives a second character and a second movement history being brought into association with the second character from another game apparatus, and performs processing of writing down a diary and giving a quiz by the character on the basis of at least one of the first character and the second character, and at least one of the first movement history and the second movement history.

30 Claims, 24 Drawing Sheets

FIG. 13
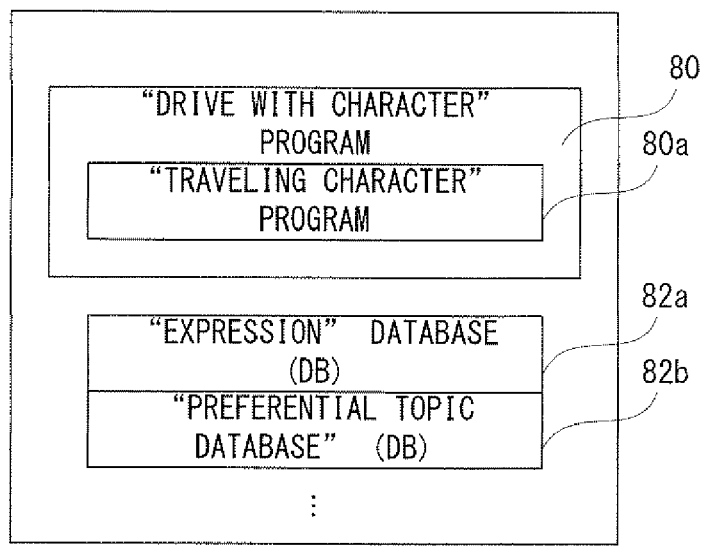
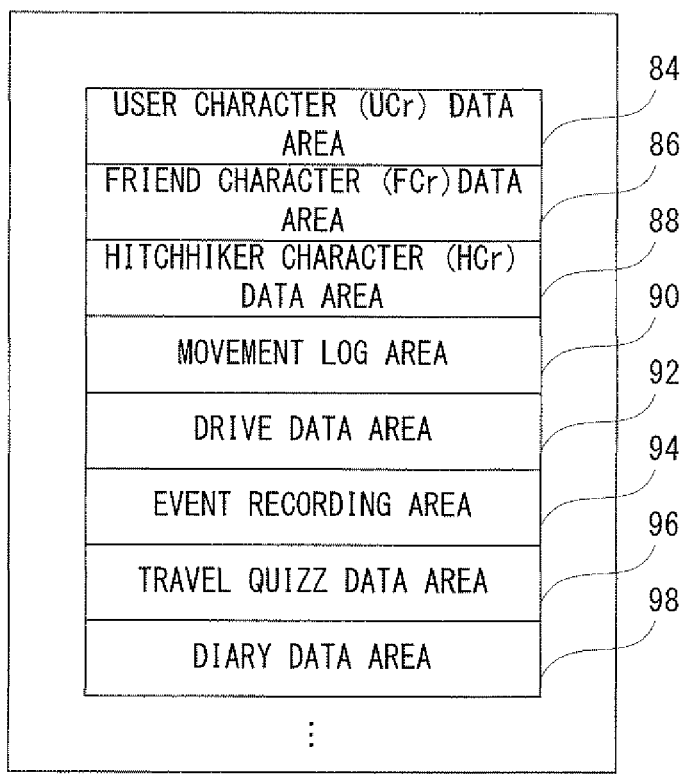

FIG. 14

("EXPRESSION" DB)                                     82a

| ATTRIBUTE | EXPRESSIONG |
|---|---|
| FATHER/ GRANDFATHER | FRANK, AND NARRATIVE EXPRESSION : "~だったな"(JAPANESE HIRAGANA (DATTANA)) |
| MOTHER/ GRANDMOTHER | COURTEOUS AND NARRATIVE EXPRESSION : "~でしたね"(JAPANESE HIRAGANA (DESHITANE)) |
| BROTHER | FRANK EXPRESSION : "~だった"(JAPANESE HIRAGANA (DATTA)) |
| SISTER | FRANK AND NARRATIVE EXPRESSION : "~だったね"(JAPANESE HIRAGANA (DATTANE)) |
| BROTHER/SISTER | FRANK AND INFORMATIVE EXPRESSION : "~だったよ"(JAPANESE HIRAGANA (DATTAYO)), "~しちゃった"(JAPANESE HIRAGANA (SHICHATTA)) |

FIG. 15

("PREFERENTIAL TOPIC" DB)                    82b

| ATTRIBUTE | PREFERENTIAL TOPIC |
|---|---|
| DRIVER | NAVIGATION |
| FATHER/MOTHER | CHILDREN, NAVIGATION |
| GRANDFATHER/ GRANDMOTHER | CHILDREN, WEATHER |
| CHILDREN | DESTINATION, GAME |

FIG. 16

(A)  (UCr DATA)  84

| CHARACTER ID |
|---|
| CHARACTER IMAGE |
| ATTRIBUTE (RELATIONSHIP) : FATHER/MOTHER/BROTHER/… |

(B)  (FCr DATA)  86

| CHARACTER ID |
|---|
| ID OF BELONGING GAME APPARATUS |
| MOVEMENT LOG : MOVING ROUTE (POSITION [UNIT OF GPS MEASURED POINT], TIME) |
| ORIGINAL TRAVEL QUIZZ AND DESIGNATED AREA INFORMATION |
| SOUVENIR TRAVEL QUIZ AND DESIGNATED AREA INFORMATION |

(C)  (HCr DATA)  88

| CHARACTER ID |
|---|
| ID OF BELONGING GAME APPARATUS |
| MOVEMENT LOG : MOVING ROUTE (TIME, POSITION) |
| ORIGINAL TRAVEL QUIZ AND DESIGNATED AREA INFORMATION |
| SOUVENIR TRAVEL QUIZ AND DESIGNATED AREA INFORMATION |

FIG. 17

(MOVEMENT LOG)    90

| POSITION | TIME |
|---|---|
| NORTH LATITUDE ****, EAST LONGITUDE **** | 08:25:35 |
| NORTH LATITUDE ****, EAST LONGITUDE **** | 08:25:40 |

(A)    (DRIVE DATA)    92

| ITEM |
|---|
| DATE AND TIME : DATE AND TIME, STARTING/ENDING TIME |
| DESTINATION |
| EVENT |
| DRIVING TIME : ACCUMULATIVE TIME OF ACTUAL DRIVING |
| OFF-ROUTE DRIVING TIME : ACCUMULATIVE TIME DURING WHICH DRIVING OFF ROUTE IS PERFORMED |
| AVERAGE FUEL |
| SEAT ARRANGEMENT OF CHARACTER |

(B)    (EVENT DATA)

| EVENT | CATEGORY | ELEMENT |
|---|---|---|
| DESTINATION SETTING/CHANGE | DESTINATION | DESTINATION NAME, COORDINATES, TIME WHEN OPERATION IS PERFORMED, OPERATOR NAME |
| SEAT SETTING /CHANGE | BASE | SEAT ARRANGEMENT, TIME WHEN OPERATION IS PERFORMED, OPERATOR NAME |
| GAME | CATEGORY | GAME NAME, PLAYING TIME, PARTICIPANT NAME, RANK |
| QUIZ | GAME | QUIZ NAME, PARTICIPANT NAME, CORRECT/INCORRECT |
| TRAFFIC JAM | NAVIGATION | PLACE OF ENCOUNTER, DEGREE, DURATION TIME |
| AUDIO INSTRUMENT OPERATION | NAVIGATION | INSTRUMENT NAME, CONTENT OF OPERATION, TIME WHEN OPERATION IS PERFORMED, OPERATOR NAME |

⋮

FIG. 29
(A) 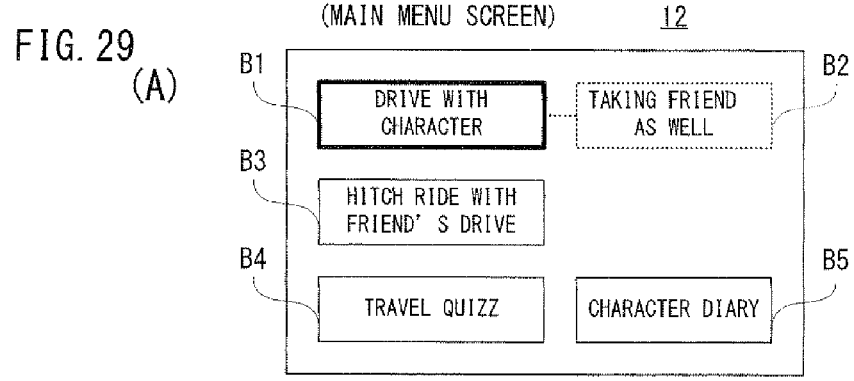
(B) 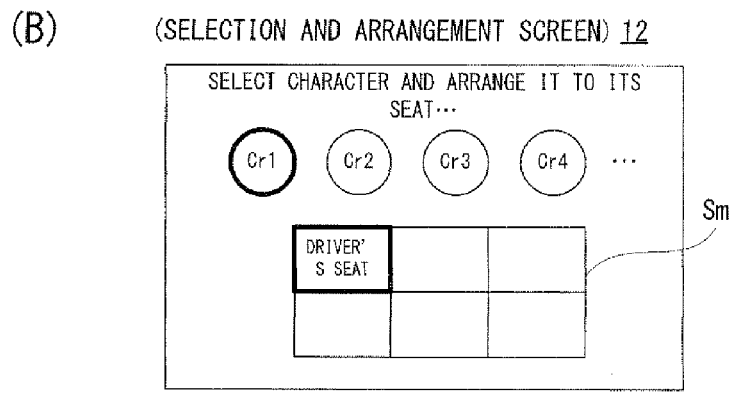
(C) 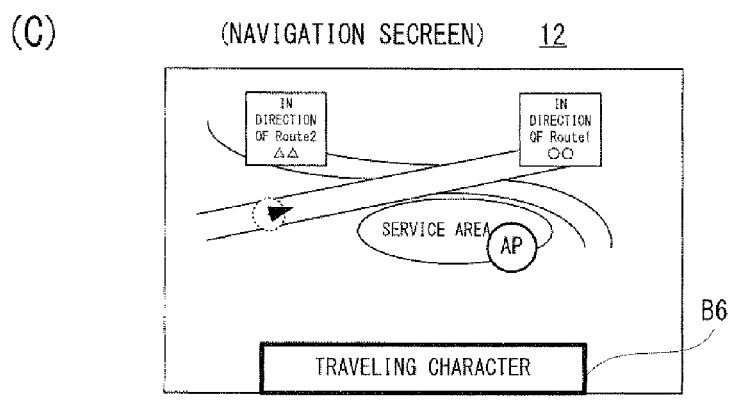
(D) 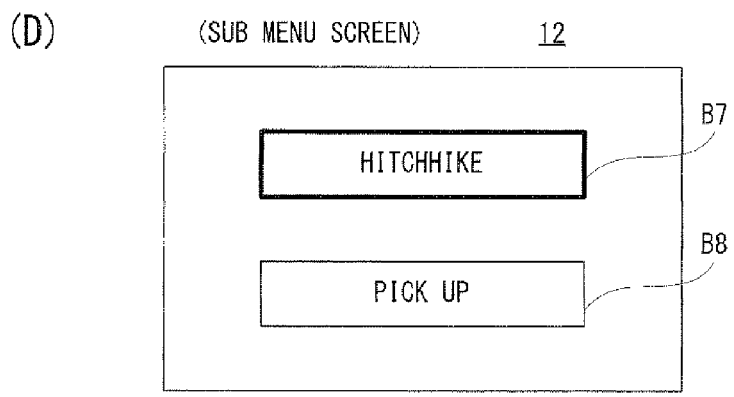

STORAGE MEDIUM STORING INFORMATION PROCESSING PROGRAM, INFORMATION PROCESSING APPARATUS, INFORMATION PROCESSING METHOD AND INFORMATION PROCESSING SYSTEM

CROSS REFERENCE OF RELATED APPLICATION

The disclosure of Japanese Patent Application No. 2010-271921 filed on Dec. 6, 2010 is incorporated herein by reference.

BACKGROUND OF THE INVENTION

1. Field

Example embodiments of the present invention relate to a storage medium storing an information processing program, an information processing apparatus, an information processing method, and information processing system. More specifically, example embodiments of the present invention relate to a storage medium storing an information processing program, an information processing apparatus, an information processing method and an information processing system that perform information processing by utilizing position information.

2. Description of the Related Art

Conventionally, as a related art of such a kind, a game apparatus disclosed in Japanese Patent Application Laid-Open No. 2001-745 (patent document 1) has been known. The game apparatus detects a current position of a player, and generates an event different depending on an area to which the detection result belongs.

However, in the related art of the patent document 1, a player who scarcely goes out hardly feels a change of the generated event, and a player who often goes out feel only the change within the moving range of himself or herself, so that the user cannot gain interest.

SUMMARY

Therefore, example embodiments of the present invention to provide a novel storage medium storing an information processing program, an information processing apparatus, an information processing method, and an information processing system.

Other example embodiments of the present invention provide a storage medium storing an information processing program, an information processing apparatus, an information processing method and an information processing system capable of making a user feel a change beyond a moving range of the user himself or herself.

Example embodiments of the invention adopt the following features in order to solve the above-described problems.

A first aspect is a storage medium storing an information processing program to be executed by a computer of an information processing apparatus which performs processing based on position information, wherein the information processing program causes the computer to function as: a data receiver which receives a character and a movement history being brought into association with the character from another information processing apparatus; a character storage which is capable of storing at least one character, a movement history storage which stores a movement history being brought into association with the character stored in the character storage; a position information acquirer which acquires position information indicating a position in which the information processing apparatus itself exists; a movement history updater which updates the movement history on the basis of the position information; and a processor which performs predetermined processing on the basis of the character and the movement history.

In the first aspect, a data receiver receives a character and a movement history being brought into association with the character from another information processing apparatus. A character storage is capable of storing at least one character, and a movement history storage stores a movement history being brought into association with the character stored in the character storage. A position information acquirer acquires position information indicating a position in which the information processing apparatus itself exists, and a movement history updater updates the movement history on the basis of the position information. A processor performs predetermined processing on the basis of the character and the movement history.

According to the first aspect, by utilizing the character received from the other information processing apparatus and the movement history, predetermined processing is performed to thereby make a user feel a change beyond a moving range of himself or herself.

Here, the predetermined processing is processing of writing a diary on the basis of the movement history, giving a quiz, and introducing a souvenir and hometown specialty by a character in one embodiment. In another embodiment, by utilizing the movement history, a character may play a game, give a quiz, and so forth.

A second aspect is a storage medium storing an information processing program according to the first aspect, wherein the information processing program causes the computer to further function as a data transmitter which transmits the character and the movement history being brought into association with the character to the other information processing apparatus.

According to the second aspect, it is also possible to make the user (another user) of the other information processing apparatus feel a similar change.

A third aspect is a storage medium storing an information processing program according to the first aspect, wherein the character storage stores a first character, and is capable of storing a second character, the data receiver receives the second character and a second movement history being brought into association with the second character from the other information processing apparatus, the movement history storage stores a first movement history being brought into association with the first character stored in the character storage, and the processor performs the predetermined processing on the basis of at least one of the first character and the second character, and at least one of the first movement history and the second movement history.

According to the third aspect, without being restricted to the first character stored by the information processing apparatus itself and the first movement history, by utilizing the second character and the second movement history that are received from the other information processing apparatus as well, the predetermined processing is executed to thereby make the user feel the change beyond the moving rage of the user himself or herself as well as the change within the moving range of the user himself or herself.

A fourth aspect is a storage medium storing an information processing program according to the third aspect, wherein the processor performs the predetermined processing on the basis of the first character stored in the character storage, the second character received by the data receiver, and the first movement history.

According to the fourth aspect, by utilizing the first character stored by the information processing apparatus, the second character received from the other information processing apparatus, and the first movement history of the information processing apparatus itself, processing of making the second character which is picked up to the drive appear while the first character writes down the event during the drive in the diary, for example, can be made possible.

A fifth aspect is a storage medium storing an information processing program according to the first aspect, wherein the movement history includes position information of a position to which the information processing apparatus itself moves and time information of a time when a movement to the position is made, and the processor performs the predetermined processing on the basis of the position information and the time information.

According to the fifth aspect, by utilizing the position information and the time information, it becomes possible to perform various processing in relation to a moving course.

A sixth aspect is a storage medium storing an information processing program according to the second aspect, wherein the data receiver directly receives from the other information processing apparatus by short distance communications, and the data transmitter directly transmits to the other information processing apparatus by the short distance communications.

In the sixth aspect, transmitting and receiving data with the other information processing apparatus is directly performed by short distance communications. Here, the short distance communications is typically short distance wireless communications, but may be wire communications by using a connecting cable. As a short distance wireless communication system, Bluetooth (registered trademark), ZigBee (registered trademark), Wibree (registered trademark), UWB (Ultra Wide Band), NFC (Near Field Communication), infrared rays system, etc. are utilized.

Moreover, transmitting and receiving data between the information processing apparatuses can also be performed via a network.

According to the sixth aspect, by directly performing transmitting and receiving data between the information processing apparatuses by the short distance communications, the user can feel realism as if he or she actually exchanges the characters.

A seventh aspect is a storage medium storing an information processing program according to the first aspect, wherein the position information acquirer directly acquires the position information from equipment having a GPS function by short distance communications.

In the seventh aspect, the position information is directly acquired from GPS equipment, such as car navigation equipment, a portable terminal with GPS by short distance communications.

Here, in a case that communication via a network is performed between the information processing apparatuses, the position information of the access point to which each information processing apparatus connects can be used.

According to the seventh aspect, by utilizing the position information from the GPS equipment, it is possible to execute the predetermined processing with high accuracy. For example, when the character writes down the diary, it can describe a place where an event occurs in detail.

An eighth aspect is a storage medium storing an information processing program according to the second aspect, wherein the information processing program causes the computer to further function as a character selector which makes a user select an arbitrary character from the characters stored in the character storage, wherein the data transmitter transmits the character selected by the character selector and the movement history being brought into association with the character to the other information processing apparatus.

According to the eighth aspect, the user can freely select the character to be sent to the other information processing apparatus from the characters stored in the character storage.

A ninth aspect is a storage medium storing an information processing program according to the first aspect, wherein the processor displays on a displayer information on a route along which the information processing apparatus itself moves on the basis of the movement history stored in the movement history storage.

According to the ninth aspect, it is possible to offer images of the information on a travel diary, a travel quiz, a souvenir and hometown specialty, for example to the user.

A tenth aspect is a storage medium storing an information processing program according to the ninth aspect, wherein the processor changes at least one of a content and an expression of the information to be displayed on the display on the basis of an attribute set for each character.

In the tenth aspect, an attribute, such as a gender, an age, a relationship is set for each character, and the content and/or expression of the information to be displayed on the display changes on the basis of the attribute of the character.

According to the tenth aspect, for example, as to the diary, the appearing topic and the used expression are changed depending on the character being the writer thereof, and therefore, the user can feel reality as if he or she actually travels.

An eleventh aspect is information processing apparatus performing processing based on position information, comprising: a data receiver which receives a character and a movement history being brought into association with the character from another information processing apparatus; a character storage which is capable of storing at least one character; a movement history storage which stores a movement history being brought into association with the character stored in the character storage; a position information acquirer which acquires position information indicating a position in which the information processing apparatus itself exists; a movement history updater which updates the movement history on the basis of the position information; and a processor which performs predetermined processing on the basis of the character and the movement history.

A twelfth aspect is information processing method to be executed by an information processing apparatus performing processing based on position information, wherein the information processing apparatus includes a character storage which is capable of storing at least one character, and a movement history storage which stores a movement history being brought into association with the character stored in the character storage, comprising steps of a data receiving step for receiving a character and a movement history being brought into association with the character from another information processing apparatus; a position information acquiring step for acquiring position information indicating a position in which the information processing apparatus itself exists; a movement history updating step for updating the movement history on the basis of the position information; and a processing step for performing predetermined processing on the basis of the character and the movement history.

A thirteenth aspect is an information processing system including a plurality of information processing apparatuses each of which performs processing based on position information, wherein each of the information processing apparatuses, comprises: a data receiver which receives a character and a movement history being brought into association with the character from another information processing apparatus; a character storage which is capable of storing at least one character; a movement history storage which stores a movement history being brought into association with the character stored in the character storage; a position information acquirer which acquires position information indicating a position in which the information processing apparatus itself exists; a movement history updater which updates the movement history on the basis of the position information; and a processor which performs predetermined processing on the basis of the character and the movement history.

In the eleventh to thirteenth aspects as well, similar to the first aspect, it is possible to make a user feel a change beyond a moving range of the user himself or herself.

A fourteenth aspect is an information processing system according to the thirteenth aspect, wherein the character storage stores a first character, and is capable of storing a second character, the data receiver receives the second character and a second movement history being brought into association with the second character from the other information processing apparatus, and the processor performs the predetermined processing on the basis of at least one of the first character and the second character, and at least one of the first movement history and the second movement history.

According to the fourteenth aspect, similar to the third aspect, it is possible to make the user feel the change beyond the moving rage of the user himself or herself as well as the change within the moving range of the user himself or herself.

A fifteenth aspect is an information processing system according to claim 14, further including a server which performs communications with each of the information processing apparatuses via a network, wherein the character storage is capable of further storing a third character, the server further comprises: a third movement history storage which stores the third character and a third movement history being brought into association with the third character; a third position information storage which, when an information processing apparatus storing the third character is connected to the network in an arbitrary position, stores third position information indicating a connected position by bringing it into association with the third character; a third movement history updater which updates the third movement history on the basis of the third position information; and a first data transmitter which, when an information processing apparatus not storing the third character is connected to the network at a position indicated by the third position information, transmits the third character and the third movement history to the information processing apparatus, and each of the information processing apparatuses further comprises a second data receiver which receives the third character and the third movement history from the server, wherein the processor performs the predetermined processing on the basis of at least one of the first to third characters and at least one of the first to third moving histories.

According to the fifteenth aspect, without being restricted to the first character stored by the information processing apparatus itself and the first movement history, by utilizing the second character and the second movement history that are received from the other information processing apparatus, and the third character and the third movement history that are received from the server as well, the predetermined processing is executed to thereby make the user more feel the change beyond the moving rage of the user himself or herself.

A sixteenth aspect is an information processing system according to the fourteenth aspect, wherein the character storage is further capable of storing a third character, each of the information processing apparatuses comprises a third movement history storage which stores the third character and a third movement history being brought into association with the third character, a third movement history updater which, when a connection is made with another information processing apparatus not storing the third character by short distance wireless communications in a state that the third character is stored, updates the third movement history, and a data transmitter/receiver which transmits and receives the third movement history updated by the third movement history updater with the third character by the short distance wireless communications, wherein the processor performs the predetermined processing on the basis of at least one of the first to third characters and at least one of the first to third moving histories.

According to the sixteenth aspect, without being restricted to the first character stored by the information processing apparatus itself and the first movement history, by utilizing the second character and the second movement history that are received from the other information processing apparatus, and the third character and the third movement history that are transmitted and received between the information processing apparatuses as well, the predetermined processing is executed to thereby make the user more feel the change beyond the moving rage of the user himself or herself.

A seventeenth aspect is an information processing system including a plurality of information processing apparatuses each of which performs processing based on position information and a server which makes communications between the respective information processing apparatuses via a network, wherein each of the information processing apparatuses comprises: a character storage which stores a first character, and is capable of storing a second character; a movement history storage which stores a movement history being brought into association with the character stored in the character storage; a first information acquirer which acquires position information indicating a position in which the information processing apparatus itself exists; and a first movement history updater which updates the movement history on the basis of the first position information, the server comprises: a character movement history storage which stores the second character and a second movement history being brought into association with the second character; a second position information acquirer which, when an information processing apparatus storing the second character is connected to the network in an arbitrary position, acquires second position information indicating the connected position; a second movement history updater which updates the second movement history on the basis of the second position information; and a first data transmitter which, when an information processing apparatus not storing the second character is connected to the network in a position indicated by the second movement history, transmits the second character and the second movement history to the information processing apparatus, and each of the information processing apparatuses further comprises: a first data receiver which receives the second character and the second movement history from the server; and a processor which performs predetermined processing on the basis of at least one of the first character and the second character, and at least one of said first movement history and said second movement history.

In the seventeenth aspect, each of the plurality of information processing apparatuses performs processing based on position information and a server which makes communications between the respective information processing apparatuses via a network.

First, in each of the information processing apparatuses, a character storage stores a first character, and is capable of storing a second character. A movement history storage stores a movement history being brought into association with the character stored in the character storage. A first information acquirer acquires position information indicating a position in which the information processing apparatus itself exists, and a first movement history updater updates the first movement history on the basis of the first position information.

On the other hand, in the server, a second movement history storage stores the second character and a second movement history being brought into association with the second character, and a second position information acquirer, when an information processing apparatus storing the second character is connected to the network in an arbitrary position, acquires second position information indicating the connected position. A second movement history updater updates the second movement history on the basis of the second position information. A first data transmitter, when an information processing apparatus not storing the second character is connected to the network in a position indicated by the second movement history, transmits the second character and the second movement history to the information processing apparatus.

Then, in each information processing apparatuses, a first data receiver receives the second character and the second movement history from the server, and a processor performs predetermined processing on the basis of at least one of the first character and the second character, and at least one of the first movement history and the second movement history.

According to the seventeenth aspect, without being restricted to the first character and the movement history that are stored by the information processing apparatus itself, by utilizing the second character and the movement history that are received from the server as well, the predetermined processing is executed to thereby make the user feel the change beyond the moving rage of the user himself or herself.

An eighteenth aspect is an information processing system according to the seventeenth aspect, wherein each of the information processing apparatuses further comprises a second data transmitter which sends back the second character received by the first data receiver to the server, and the server further comprises a second data receiver which receives the second character sent back by the second data transmitter.

In the eighteenth aspect, in each of the information processing apparatuses, a second data transmitter sends back the second character received by the first data receiver to the server, and in the server, a second data receiver receives the second character sent back by the second data transmitter.

According to the eighteenth aspect, each of the information processing apparatuses can exchange the second character via the server.

A nineteenth aspect is an information processing system according to the seventeenth aspect, wherein the network is provided with a plurality of access points, each of the information processing apparatuses further comprises a connector which connects to the nearest access point out of the plurality of access points, and the second position information acquirer acquires information indicating a position of the access point to which the connector is connected as the second position information.

In the nineteenth aspect, as second position information, the position information of the access point to which each information processing apparatus connects is utilized.

According to the nineteenth aspect, the server can grasp a position of each of the information processing apparatuses on an access point-to-access point basis. Within the virtual space realized by the information processing system, the first character moves (drives) by the information processing apparatus (vehicle having it) of its own, and the second character moves (hitchhikes) between the access points while picked up by another vehicle.

A twentieth aspect is an information processing system according to the nineteenth aspect, wherein the first movement history includes position information of a position to which each of the information processing apparatus moves and time information of a time when a movement to the position is made, the second movement history includes position information of a position of an access point to which each of the information processing apparatuses connects and time information when a connection is made to the position, and the processor performs the predetermined processing on the basis of the position information and the time information.

According to the twentieth aspect, it becomes possible to perform various processing in relation to the moving course by utilizing the position information and the time information.

A twenty-first aspect is an information processing system according to the twentieth aspect, wherein the first data transmitter, in a case that a plurality of second characters are brought into association with the access point to which the connector connects, transmits to the second character having the oldest connection time to the access point.

In the twenty-first aspect, in a case that a plurality of second characters are brought into association with the destination of the connection, by referring the connection time of the respective characters, the second character having the oldest connection time is selected.

According to the twenty-first aspect, it is possible to efficiently move the second character within the virtual space.

A twenty-second aspect is an information processing system according to the nineteenth aspect, wherein each of the access points belongs to any one of a plurality of areas which are covered by the network, and the first transmitter, in a case that a second character is not brought into association with the access point to which the connector connects, transmits to the second character which is brought into association with another access point belonging to the same area to which the access point belongs.

In the twenty-second aspect, in a case that the second character is not brought into association with the destination of the connection, a second character being brought into association with another access point (being brought into association with the access point of the connection destination) within the same area is selected.

According to the twenty-second aspect, by extending a range of selection to the surrounding of the access point, the movement of the second character within the virtual space can be animated.

A twenty-third aspect is an information processing system according to the nineteenth aspect, wherein each of the information processing apparatuses further comprises a third data transmitter which transmits the first character to the server, wherein the second data receiver further receives the first character transmitted by each of the information processing apparatuses, the server further comprising a fourth transmitter which, in a case that the first character is included in the access point to which the connector of each of the information processing apparatus connects, sends back the first character and the movement history that is brought into association with the first character to the information processing apparatus, and each of the information processing apparatuses further comprises a third data receiver which receives the first character and the movement history being brought into association with the first character from the server, and the processor performs the predetermined processing on the basis of the first character and the movement history being brought into association with the first character that are received by the third data receiver.

In the twenty-third aspect, in each of the information processing apparatuses, a third data transmitter transmits the first character to the server. In the server, the second data receiver further receives the first character transmitted by each of the information processing apparatuses, and a fourth transmitter, in a case that the first character is included in the access point to which the connector of each of the information processing apparatus connects, sends back the first character and the movement history that is brought into association with the first character to the information processing apparatus. Then, in each of the information processing apparatuses, a third data receiver receives the first character and the movement history being brought into association with the first character that are received from the server, and the processor performs the predetermined processing on the basis of the first character and the movement history being brought into association with the first character that are received by the third data receiver.

According to the twenty-third aspect, in each of the information processing apparatuses, the first character of its own is sent to the server, to thereby make it movable (hitchhiker) between the access points within the virtual space by being picked up by the another information processing apparatus. Thereafter, when the information processing apparatus is connected to a certain access point, in a case that the first character of its own is brought into association with the access point, the first character is sent back to the information processing apparatus. That is, the first character sent as a hitchhiker from each of the information processing apparatuses is returned to the information processing apparatus as a sending source when encountering it during traveling by hitchhike.

Here, in one embodiment, it is also possible to forcibly return the first character sent as a hitchhiker in response to a request from the original information processing apparatus.

A twenty-fourth aspect is an information processing system according to the twenty-third aspect, wherein each of the information processing apparatuses functions as a character selector which makes a user select an arbitrary first character from the character storage, wherein the third data transmitter transmits the first character selected by the character selector to the server.

In the twenty-fourth aspect, in each of the information processing apparatuses, a character selector makes a user select an arbitrary first character from the characters stored in the character storage, wherein the third data transmitter transmits the first character selected by the character selector to the server.

According to the twenty-fourth aspect, it is possible for the user to freely select the first character to be sent as a hitchhiker.

A twenty-fifth aspect is an information processing system according to the twenty-third aspect, wherein the processor displays on a display information on a route along which the first character moves on the basis of the first character and the movement history being brought into association with the first character that are received by the third data receiver.

According to the twenty-fifth aspect, by utilizing the first character and the second movement history that are sent back from the server, processing of writing down the event occurring during the hitchhike by the user, for example, is made possible.

A twenty-sixth aspect is an information processing system according to the twenty-fifth aspect, wherein the processor changes at least one of a content and an expression of the information to be displayed on the display on the basis of an attribute set for each character.

In the twenty-sixth aspect, an attribute, such as a gender, an age, a relationship is set for each character, and the content and/or expression of the information to be displayed on the display changes on the basis of the attribute of the character.

According to the twenty-sixth aspect, as to the diary, the appearing topic and the used expression are changed depending on the character being the writer thereof, and therefore, the user can feel reality as if he or she actually travels.

A twenty-seventh aspect is a storage medium storing an information processing program for an information processing system including a plurality of information processing apparatuses each of which performs processing based on position information, and a server which makes communications with each of the information processing apparatuses via a network, the information processing program causes a computer of each of the information processing apparatuses to function as: a character storage which stores a first character, and is capable of storing a second character; a movement history storage which stores a movement history being brought into association with the character stored in the character storage; a first information acquirer which acquires position information indicating a position in which the information processing apparatus itself exists; and a first movement history updater which updates the movement history on the basis of the first position information, causes a computer of the server to function as: a character movement history storage which stores the second character and a second movement history being brought into association with the second character; a second position information acquirer which, when an information processing apparatus storing the second character is connected to the network in an arbitrary position, acquires second position information indicating the connected position; a second movement history updater which updates the second movement history on the basis of the second position information; and a first data transmitter which, when an information processing apparatus not storing the second character is connected to the network in a position indicated by the second movement history, transmits the second character and the second movement history to the information processing apparatus, and causes a computer of each of the information processing apparatuses to function as: a first data receiver which receives the second character and the second movement history from the server; and a processor which performs predetermined processing on the basis of at least one of the first character and the second character, and at least one of the first movement history and the second movement history.

A twenty-eighth aspect is an information processing method for an information processing system including a plurality of information processing apparatuses each of which performs processing based on position information, and a server which makes communications with each of the information processing apparatuses via a network, wherein each of the information processing apparatuses includes a character storage which stores a first character and is capable of storing at least a second character, and a movement history storage which stores a movement history being brought into association with the character stored in the character storage, including steps to be executed by each of the information processing apparatuses of: a first information acquiring step for acquiring first position information indicating a position in which the information processing apparatus itself exists; and a first movement history updating step for updating the movement history on the basis of the first position information; wherein the server includes a character movement history storage which stores the second character and a second movement history being brought into association with the second character, including steps to be executed by the server of: a second position information acquiring step for, when an information processing apparatus storing the second character is connected to the network in an arbitrary position, acquiring second position information indicating the connected position; a second movement history updating step for updating the second movement history on the basis of the second position information; and a first data transmitting step for, when an information processing apparatus not storing the second character is connected to the network in a position indicated by the second movement history, transmitting the second character and the second movement history to the information processing apparatus, and including steps to be executed by each of the information processing apparatuses of: a first data receiving step for receiving the second character and the second movement history from the server; and a processing step for performing predetermined processing on the basis of at least one of the first character and the second character, and at least one of the first movement history and the second movement history.

A twenty-ninth aspect is an information processing apparatus performing processing based on position information and makes communications with a server via a network, comprising: a character storage which stores a first character, and is capable of storing a second character; a movement history storage which stores a movement history being brought into association with the character stored in the character storage; a first information acquirer which acquires position information indicating a position in which the information processing apparatus itself exists; and a first movement history updater which updates the movement history on the basis of the first position information, the server includes a character movement history storage which stores the second character and a second movement history being brought into association with the second character; a second position information acquirer which, when an information processing apparatus storing the second character is connected to the network in an arbitrary position, acquires second position information indicating the connected position; a second movement history updater which updates the second movement history on the basis of the second position information; and a first data transmitter which, when an information processing apparatus not storing the second character is connected to the network in a position indicated by the second movement history, transmits the second character and the second movement history to the information processing apparatus, and further comprising: a first data receiver which receives the second character and the second movement history from the server; and a processor which performs predetermined processing on the basis of at least one of the first character and the second character, and at least one of the first movement history and the second movement history.

A thirtieth aspect is a server making communications with a plurality of information processing apparatuses each of which performs processing based on position information via network, wherein each of the information processing apparatuses includes: a character storage which stores a first character, and is capable of storing a second character; a movement history storage which stores a movement history being brought into association with the character stored in the character storage; a first information acquirer which acquires position information indicating a position in which the information processing apparatus itself exists; and a first movement history updater which updates the movement history on the basis of the first position information, comprising: a character movement history storage which stores the second character and a second movement history being brought into association with the second character; a second position information acquirer which, when an information processing apparatus storing the second character is connected to the network in an arbitrary position, acquires second position information indicating the connected position; a second movement history updater which updates the second movement history on the basis of the second position information; and a first data transmitter which, when an information processing apparatus not storing the second character is connected to the network in a position indicated by the second movement history, transmits the second character and the second movement history to the information processing apparatus, wherein each of the information processing apparatuses further includes: a first data receiver which receives the second character and the second movement history from the server; and a processor which performs predetermined processing on the basis of at least one of the first character and the second character, and at least one of the first movement history and the second movement history.

In each of the twenty-seventh to thirtieth aspects as well, similar to the seventeenth aspect, it is possible to make the user feel a change beyond a moving range of the user himself or herself.

According to example embodiments of the present invention, it is possible to implement a storage medium storing an information processing program, an information processing apparatus, an information processing method and an information processing system capable of make a user feel a change beyond a moving range of the user himself or herself by performing information processing with the use of position information beyond the moving range of the user.

The above described features, aspects and advantages of example embodiments of the present invention will become more apparent from the following detailed description of example embodiments of the present invention when taken in conjunction with the accompanying drawings

BRIEF DESCRIPTION OF THE DRAWINGS

FIG. 3(A) shows one side surface in a close state, FIG. 3(B) shows a top surface in the close state, FIG. 3(C) shows the other side surface in the close state, and FIG. 3(D) shows a bottom surface in the close state;

FIG. 13 is an illustrative view showing a part of a memory map of the game apparatus, FIG. 13(A) shows a map of a memory for saved data, and FIG. 13(B) shows a map of the memory for saved data;

FIG. 14 is an illustrative view showing a configurational example of a "expression" database (DB) stored in the memory for saved data of the game apparatus;

FIG. 15 is an illustrative view showing a configurational example of a "preferential topic" DB stored in the memory for saved data of the game apparatus;

FIG. 16 is an illustrative view showing a configurational example of various character data stored in a main memory of the game apparatus, FIG. 16(A) is a configuration example of user character (UCr) data, FIG. 16(B) is a configuration example of friend character (FCr) data, and FIG. 16(C) is a configuration example of HCr data;

FIG. 17 is an illustrative view showing a configurational example of a movement log stored in the main memory of the game apparatus;

FIG. 18(A) is an illustrative view showing a configurational example of the drive data stored in the main memory of the game apparatus, and FIG. 18(B) is an illustrative view showing data structure of an "event" recorded in the drive data;

FIG. 29 is an illustrative view showing another example of the display screen of the game apparatus, FIG. 29(A) shows a main menu screen, FIG. 29(B) shows a selection and arrangement screen, FIG. 29(C) shows a navigation screen, and FIG. 29(D) shows a submenu screen.

DETAILED DESCRIPTION OF THE EXAMPLE EMBODIMENTS

Figure 1:
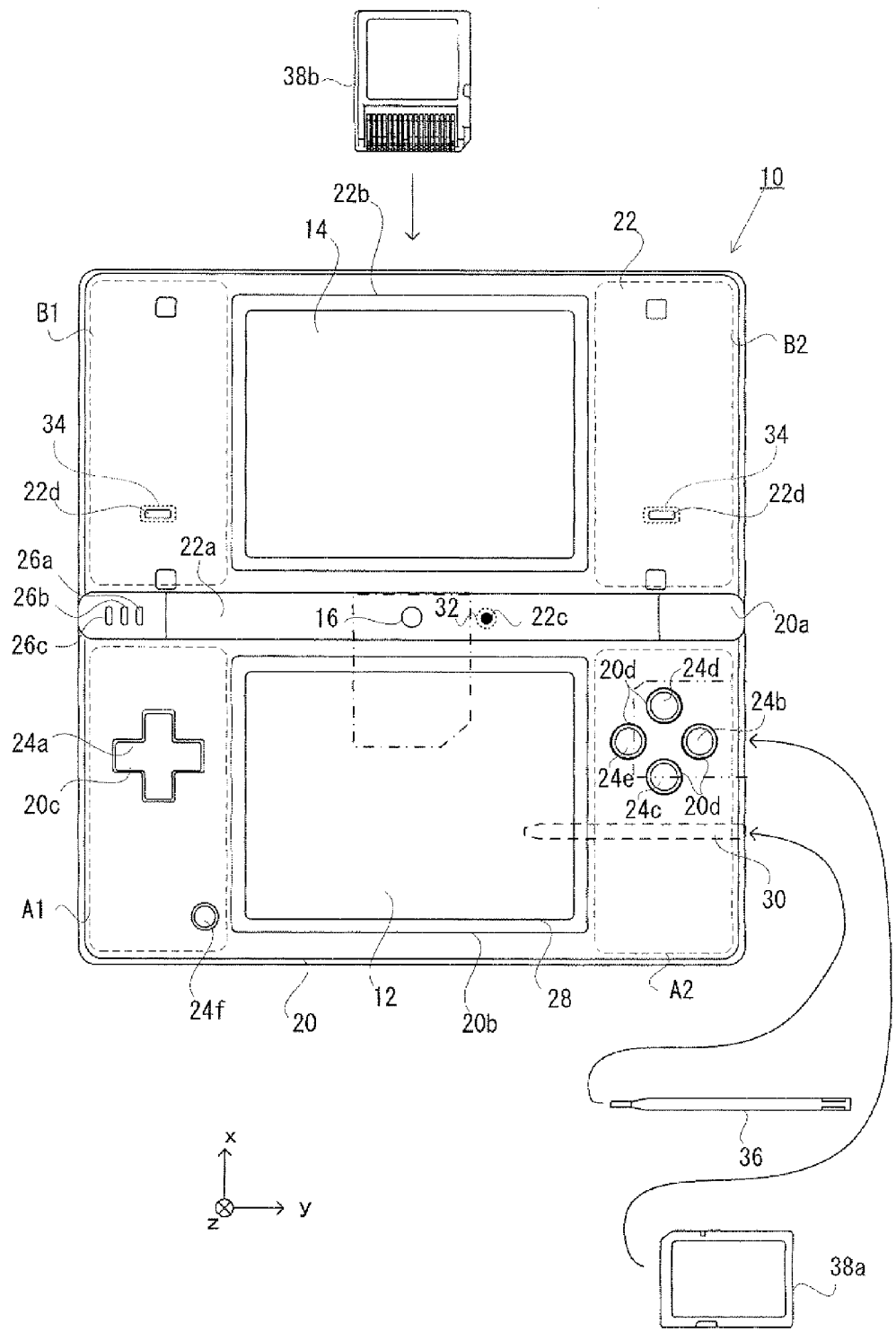
FIG. 1 is an external view of a game apparatus to be utilized in one embodiment of the present invention to show a front surface in an open state.
Figure 2:
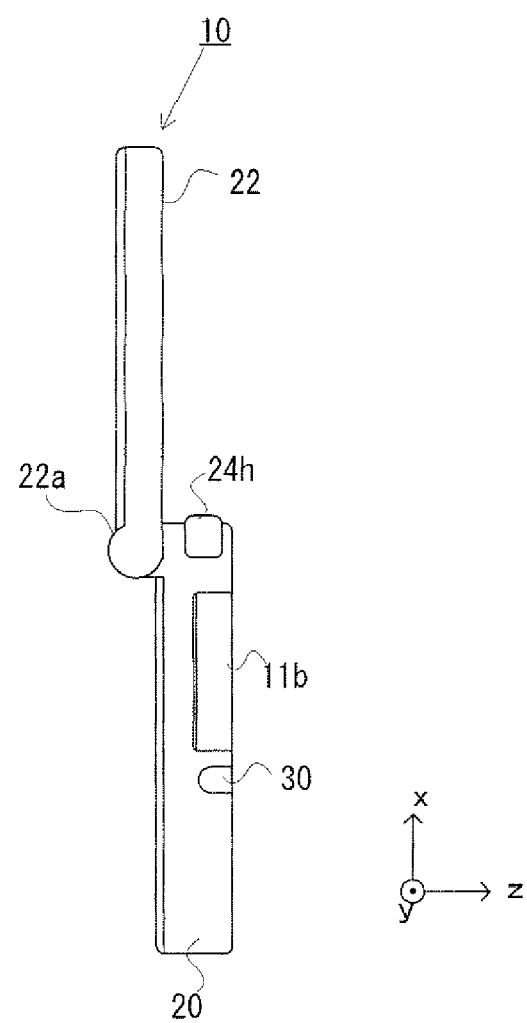
FIG. 2 is an external view of the game apparatus to show a side surface in an open state.
Figure 3:
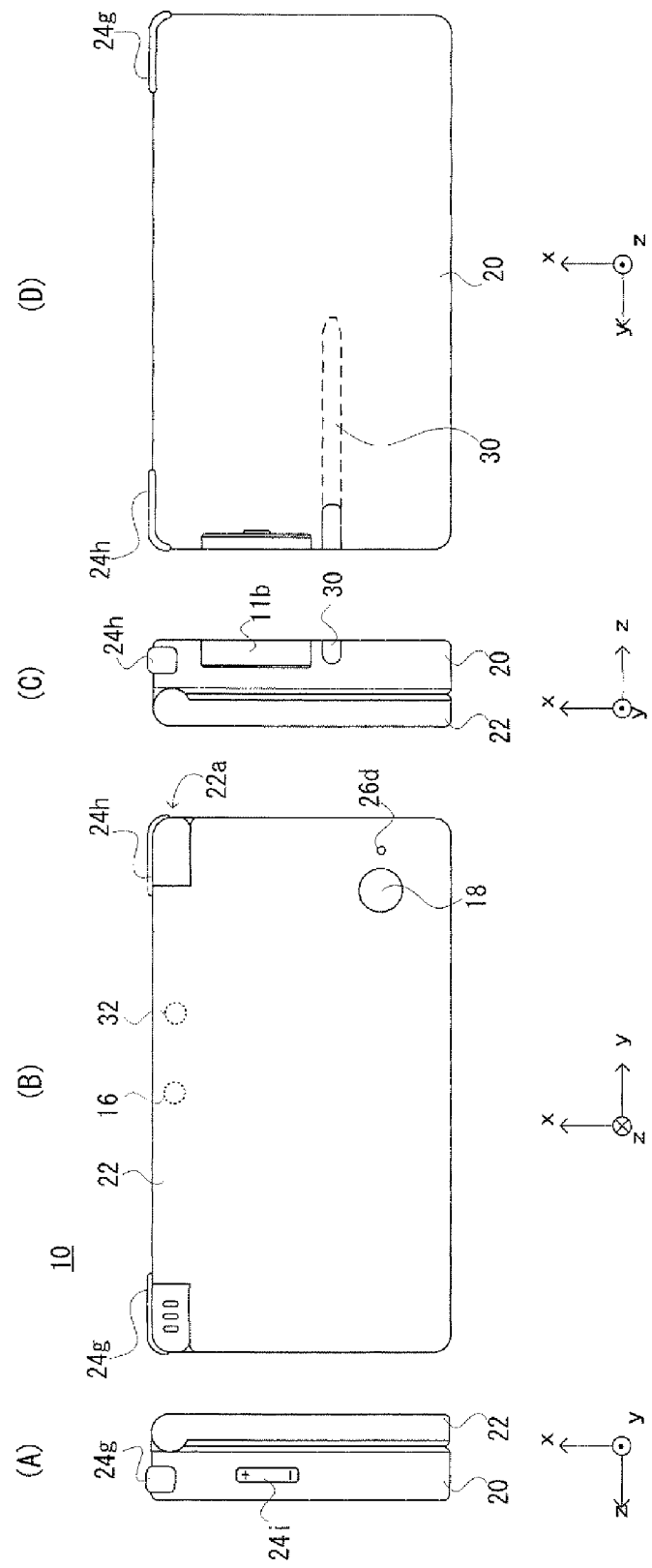
FIG. 3 is an external view of the game apparatus.

In FIG. 1 to FIG. 3, an external view of a game apparatus 10 of one embodiment of the present invention is shown. The game apparatus 10 is a foldable game apparatus, and each of FIG. 1 and FIG. 2 shows the game apparatus 10 in an opened state (open state), and FIG. 3 shows the game apparatus 10 in a closed state (close state). Furthermore, FIG. 1 is a front view of the game apparatus 10 in the open state, and FIG. 2 is a side view of the game apparatus in the open state. The game apparatus 10 has two displays (LCDs 12 and 14) and two cameras (cameras 16 and 18), can image images with the cameras, display the imaged images and store the data of the imaged images.

The game apparatus has a size small enough to be held with one hand or both hands in an open state.

The game apparatus 10 has two housings of a lower housing 20 and an upper housing 22. The lower housing 20 and the upper housing 22 are connected with each other so as to be opened or closed (foldable). In this embodiment, the respective housings 20 and 22 are formed in the form of plate of a horizontally long rectangular, and are rotatably connected with each other at the long sides of both of the housings.

The upper housing 22 is supported pivotally at a part of the upper side of the lower housing 20. This makes the game apparatus 10 to take a close state (the angle formed by the lower housing 20 and the upper housing 22 is about 0° (see FIG. 3)) and an open state (the angle formed by the lower housing 20 and the upper housing 22 is about 180° (see FIG. 2)). The user generally uses the game apparatus 10 in the open state, and keeps the game apparatus 10 in the close state when not using the game apparatus 10. Furthermore, the game apparatus 10 can maintain the angle formed by the lower housing 20 and the upper housing 22 at an arbitrary angle between the close state and the open state by friction, etc. exerted on the hinge as well as the close state and the open state as described above. That is, the upper housing 12 can be fixed with respect to the lower housing 14 at an arbitrary angle.

The configuration of the lower housing 20 is first explained. As shown in FIG. 1, the game apparatus 10 has the lower LCD (liquid crystal display) 12. The lower LCD 12 takes a horizontally-long shape, and is arranged such that the direction of the long side is coincident with the long side of the lower housing 20. The lower LCD 12 is housed in the lower housing 20. The lower LCD 12 is provided on an inner surface of the lower housing 20. Accordingly, if the game apparatus 10 is not in use, the game apparatus 10 is in the close state to thereby prevent the screen of the lower LCD 12 from being soiled, damaged, and so forth. Additionally, in this embodiment, an LCD is used as a display, but other arbitrary displays, such as a display utilizing EL (Electro Luminescence), for example, may be used. Furthermore, the game apparatus 10 can employ a display of an arbitrary resolution. Additionally, in a case that the game apparatus 10 is used as an imaging device, the lower LCD 12 is used for displaying, in real time, images (through image) imaged by the camera 16 or 18.

The inner surface of the lower housing 20 is formed to be approximately planar. At the center of the inner surface, an opening 20b for exposing the lower LCD 12 is formed. At the left of the opening 20b (in the negative direction of the y axis in the drawing), an opening 20c is formed, and at the right of the opening 20b, an opening 20d is formed. The openings 20b and 20c are for exposing the respective keytops (the top surfaces of the respective buttons 24a to 24e). Then, the screen of the lower LCD 12 provided inside the lower housing 20 is exposed from the opening 20b, and the respective keytops are exposed from the openings 20c and 20d. Thus, on the inner surface of the lower housing 20, on both sides of the opening 20b for the lower LCD 12 set at the center, non-screen areas (dotted line areas A1 and A2 shown in FIG. 1.

More specifically, areas for arranging the respective buttons 24a to 24e; button arranging area) are provided.

On the lower housing 20, the respective buttons 24a to 24i and a touch panel 28 are provided as input devices. As shown in FIG. 1, the direction input button 24a, the button 24b, the button 24c, the button 24d, the button 24e, and the power button 24f out of the respective buttons 24a to 24i are provided on the inner surface of the lower housing 20. The direction input button 24a is utilized for a selecting operation, for example, and the respective buttons 24b to 24e are utilized for a decision operation and a cancelation operation, for example. The power button 24f is utilized for turning on/off the power of the game apparatus 10. Here, the direction input button 24a and the power button 24f are provided on one side (left side in FIG. 1) of the lower LCD 12 provided at substantially the center of the lower housing 20, and the buttons 24b to 24e are provided at the other side (right side in FIG. 1) of the lower LCD 12. The direction input button 24a and the buttons 24b to 24e are utilized for performing various operations on the game apparatus 10.

FIG. 3(A) is a left side view of the game apparatus 10 in the close state, FIG. 3(B) is a front view of the game apparatus 10, FIG. 3(C) is a right side view of the game apparatus 10, and FIG. 3(D) is a rear view of the game apparatus 10. As shown in FIG. 3(A), the volume button 24i is provided on the left side surface of the lower housing 20. The volume button 24i is utilized for adjusting a volume of a speaker 34 furnished in the game apparatus 10. Furthermore, as shown in FIG. 3(D), the button 24h is provided at the right corner of the upper side surface of the lower housing 20. The button 24g is provided at the left corner of the upper side surface of the lower housing 20. The both of the buttons 24g and 24h are utilized for performing an imaging instructing operation (shutter operation) on the game apparatus 10, for example. Alternatively, both of the buttons 24g and 24h may be made to work as shutter buttons. In this case, a right-handed user can use the button 24h, and a left-handed user can use the button 24g, capable of improving usability for both of the users. Additionally, the game apparatus 10 can constantly make both of the buttons 24g and 24h valid as shutter buttons, or the game apparatus 10 is set to be a right-handed use or a left-handed use (the setting is input by the user according to a menu program, etc. and the set data is stored), and when the right-handed use is set, only the button 24h is made valid, and when the left-handed use is set, only the button 24g may be made valid.

As shown in FIG. 1, the game apparatus 10 is further provided with the touch panel 28 as an input device other than the respective operation buttons 24a to 24i. The touch panel 28 is set on the screen of the lower LCD 12. In this embodiment, the touch panel 28 is a touch panel of a resistance film system. Here, the touch panel can employ arbitrary push type touch panels over the resistance film system. In this embodiment, as the touch panel 28, a touch panel having a resolution (detection accuracy) the same as that of the lower LCD 12 is utilized. The resolution of the touch panel 28 and the resolution of the lower LCD 12 are not necessarily coincident with each other. Furthermore, at the right side surface of the lower housing 20, an inserting portion 30 (shown by a dotted line in FIG. 1 and FIG. 3(D)) is provided. The inserting portion 30 can accommodate a touch pen 36 utilized for performing an operation on the touch panel 28. It should be noted that an input to the touch panel 28 is generally performed by means of the touch pen 36, but can be performed on the touch panel 28 with fingers of the user besides the touch pen 36.

As shown in FIG. 2 and FIG. 3 (C), on the right side surface of the lower housing 20, an openable and closeable cover portion 11b is provided. Inside the cover portion 11b, a loading slot (chain double-dashed line) into which a memory card 38a is loaded and a connector (not illustrated) for electrically connecting the game apparatus 10 and the memory card 38a are provided. The memory card 38a is detachably attached to a connector. The memory card 38a is used for storing (saving) image data imaged by the game apparatus 10, for example and is formed of a nonvolatile memory, or the like.

In addition, on a top surface of the lower housing 20, a loading slot (dashed line) into which a memory card 38b is loaded and a connector (not illustrated) electrically connecting the game apparatus 10 and the memory card 38b are provided. The memory card 38b is used for storing a program to be operated in the game apparatus 10, for example.

As shown in FIG. 1, three LEDs 26a-26c are attached to a left part of the shaft 20a of the lower housing 20. Here, the game apparatus 10 can make a wireless communication (Wi-Fi communications and local communications: described later) with another appliance and another game apparatus (not illustrated) of the same kind, and the first LED 26a lights up when the wireless communication is established. The second LED 26b lights up during charge of the game apparatus 10. The third LED 26c lights up when the game apparatus 10 is turned on. Accordingly, by the three LEDs 26a-26c, it is possible to notify the communication-established state, a charge state, and an on-off situation of the power source of the game apparatus 10 to the user.

Figure 4:
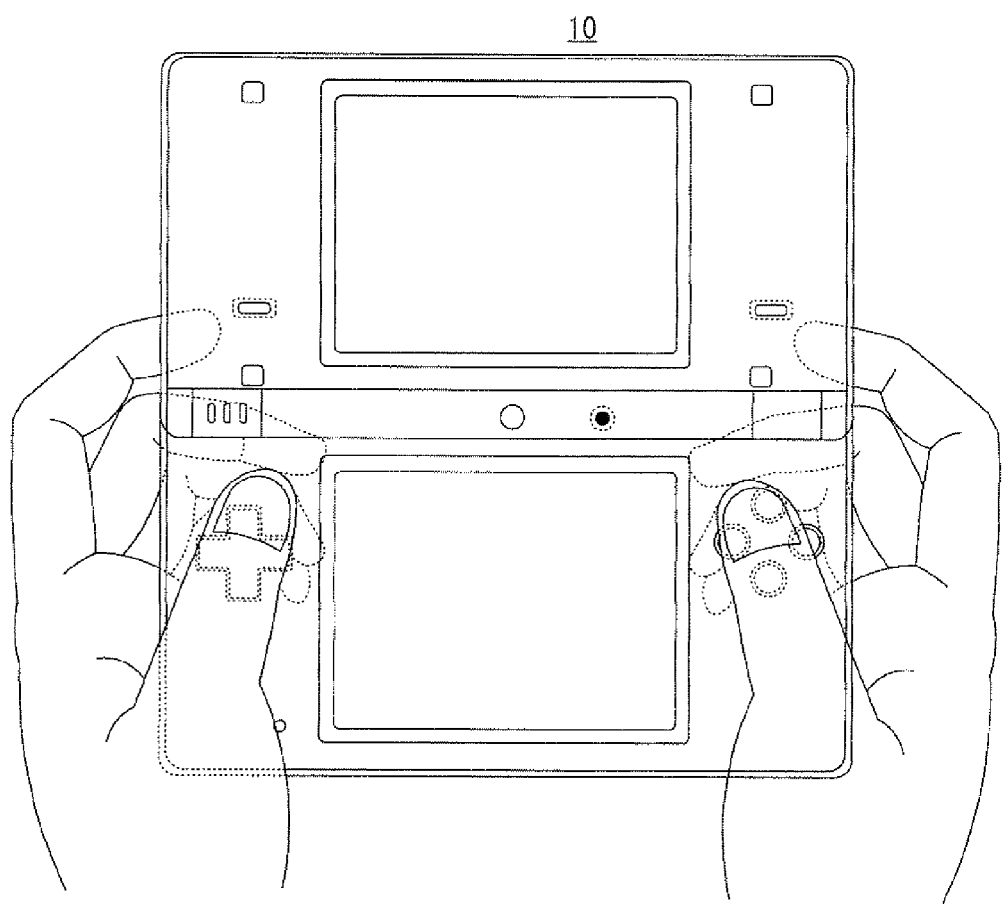
FIG. 4 shows an illustrative view showing a situation in which the game apparatus is held by the user.

As described above, the lower housing 20 is provided with the input device (touch panel 28 and respective buttons 24a-24i) for performing an operation input to the game apparatus 10. Accordingly, when utilizing the game apparatus 10, the user can perform an operation on the game apparatus 10 while holding the lower housing 20. FIG. 4 shows a situation in which the user holds the game apparatus 10 with both of the hands. As shown in FIG. 4, the user holds the side surface and the outer surface (surface opposite to the inner surface) of the lower housing 20 with the palms, the middle fingers, the ring fingers and the little fingers of both of the hands in a state that the respective LCDs 12 and 14 are directed to the user. By holding the game apparatus 10 in such a manner, the user can perform operations as to the respective buttons 24a-24e with the thumbs, and perform operations as to the buttons 24g and 24h with the index fingers while holding the lower housing 20.

On the other hand, the upper housing 22 has a configuration for imaging an image (camera), and a configuration for displaying the imaged image (display). The configuration of the upper housing 22 is explained below.

As shown in FIG. 1, the game apparatus 10 has the upper LCD 14. The upper LCD 14 is housed in the upper housing 22. The upper LCD 14 takes a horizontally-long shape, and is arranged such that the direction of the long side is coincident with the long side of the upper housing 22. The upper LCD 14 is provided on the inner surface of the upper housing 2 (the inner surface when the game apparatus 10 is in the close state). Accordingly, if the game apparatus 10 is not in use, the game apparatus 10 is set to the close state to thereby prevent the screen of the upper LCD 14 from being soiled, damaged, and so forth. Here, similar to the lower LCD 12, in place of the upper LCD 14, a display with an arbitrary form and an arbitrary resolution may be utilized. It should be noted that in another embodiment, a touch panel may be provided on the upper LCD 14 as well.

Furthermore, the game apparatus 10 has the two cameras 16 and 18. The respective cameras 16 and 18 are housed in the upper housing 22. As shown in FIG. 1, the inward camera 16 is attached to the inner surface of the upper housing 22. On the other hand, as shown in FIG. 3(B), the outward camera 18 is attached to the surface being opposed to the surface to which the inward camera 16 is provided, that is, the outer surface of the upper housing 22 (outer surface when the game apparatus 10 is in the close state). Thus, the inward camera 16 can image a direction to which the inner surface of the upper housing 22 is turned, and the outward camera 18 can image a direction opposite to the imaging direction of the inward camera 16, that is, a direction to which the outer surface of the upper housing 22 is turned. As described above, in this embodiment, the two cameras 16 and 18 are provided so as to make the imaging directions opposite to each other. Accordingly, the user can image the two different directions without shifting the game apparatus 10 inside out. For example, the user can image a landscape as the user is seen from the game apparatus 10 with the inward camera 16, and can image a landscape as the direction opposite to the user is seen from the game apparatus 10 with the outward camera 18.

Furthermore, the inward camera 16 is attached to the center of the shaft portion 22a formed at the bottom of the upper housing 22. That is, the inward camera 16 is attached at the center of the part where the two housings 20 and 22 are connected. Accordingly, in a case that the game apparatus 10 is in the open state, the inward camera 16 is arranged between the two LCDs 12 and 14 (see FIG. 1). In other words, the inward camera 16 is positioned in the vicinity of the center of the game apparatus 10. Here, the center of the game apparatus 10" means the center of the operation surface of the game apparatus 10 (surface being made up of the inner surfaces of the respective housings 20 and 22 in the open state). Here, it may be said that the inward camera 16 is arranged in the vicinity of the center in the horizontal direction of the LCDs 12 and 14. In this embodiment, when the game apparatus 10 is set to the open state, the inward camera 16 is arranged in the vicinity of the center of the game apparatus 10, and therefore, in a case that the user images the user himself or herself by the inward camera 16, the user may hold the game apparatus 10 at a position directly opposite to the game apparatus 10. That is, if the user holds the game apparatus at a normal holding position, the user is positioned at approximately the center of an imaging range, and the user himself or herself can easily be within the imaging range.

Furthermore, as shown in FIG. 3(B), the outward camera 18 is arranged at the upper end of the upper housing 22 (portion far away from the lower housing 20) in a case that the game apparatus 10 is set to the open state. Here, since the outward camera 18 is not for imaging the user holding the game apparatus 10, there is less need for being provided at the center of the game apparatus 10.

Furthermore, as shown in FIG. 1 or FIG. 3(B), a microphone 32 is housed in the upper housing 22. More specifically, the microphone 32 is attached to the shaft portion 22a of the upper housing 22. In this embodiment, the microphone 32 is attached around the inward camera 16 (next to the inward camera 16 along the y axis), and specifically attached next to the inward camera 16 in the positive direction of the y axis. Furthermore, a through hole for microphone 22c is mounted to the shaft portion 22a at a position corresponding to the microphone 32 (next to the inward camera 16) such that the microphone 32 can detect a sound outside the game apparatus 10. Alternatively, the microphone 32 may be housed in the lower housing 20. For example, the through hole for microphone 22c is provided on the inner surface of the lower housing 20, specifically, at the lower left (button arranging area A1) of the inner surface of the lower housing 20, and the microphone 32 may be arranged in the vicinity of the through hole for microphone 22c within the lower housing 20. Furthermore, the microphone 32 is attached in such a direction that its sound collecting direction (direction in which the sensitivity becomes maximum) is approximately in parallel with the imaging direction (optical axis) of the inward camera 16 (in other words, the sound collecting direction and the imaging direction are approximately in parallel with the z axis). Thus, a sound generated within the imaging range of the inward camera 16 is suitably acquired by the microphone 32. That is, detection of a sound input through the microphone 32 and detection of the user by the imaged image by the inward camera can be simultaneously performed, and accuracy of the detections can be improved, at the same time.

As shown in FIG. 3(B), on the outer surface of the upper housing 22, a fourth LED 26d is attached. The fourth LED 26d is attached around the outward camera 18 (at the right side of the outward camera 18 in this embodiment). The fourth LED 26d lights up at a time when an imaging is made with the inward camera 16 or the outward camera 18 (shutter button is pushed). Furthermore, the fourth LED 38 continues to light up while a motion image is imaged by the inward camera 16 or the outward camera 18. By making the fourth LED 26d light up, it is possible to inform an object to be imaged that an imaging with the game apparatus 10 is made (is being made).

Furthermore, the inner surface of the lower housing 22 is formed to be approximately planar. As shown in FIG. 1, at the center of the inner surface, an opening 22b for exposing the upper LCD 14 is formed. The screen of the upper LCD 14 housed inside the upper housing 22 is exposed from the opening 22b. Furthermore, on both side of the aforementioned opening 22b, a sound release hole 22d is formed one by one. Inside the sound release hole 22d of the upper housing 22, a speaker 34 is hosed. The sound release hole 22d is a through hole for releasing a sound from the speaker 34.

Thus, on the inner surface of the upper housing 22, non-display areas (areas B1 and B2 represented by a dotted lines in FIG. 1. More specifically, areas for arranging the speaker 34; speaker arranging areas) are provided on both sides of the opening 21B set at the center of the upper LCD 14. The two sound release holes 22d are arranged at approximately the center of the horizontal direction of each speaker arranging area with respect to the horizontal direction, and at the lower portion of each speaker arranging area with respect to the vertical direction (area close to the lower housing 20).

Here, as described above, by providing the non-display areas on the lower housing 20 and the upper housing 22 at the same positions in the horizontal direction, the game apparatus 10 is configured to help user's holding not only when it is held horizontally as shown in FIG. 4, but also when it is held vertically (a state rotated to left or right by 90° from the state shown in FIG. 4).

As described above, the upper housing 22 is provided with the cameras 16 and 18 which are configured to image an image and the upper LCD 14 as a display means for mainly displaying the imaged image. On the other hand, the lower housing 20 is provided with the input device (touch panel 28 and respective buttons 24a-24i) for performing an operation input to the game apparatus 10. Accordingly, when utilizing the game apparatus 10 as an imaging device, the user can perform an input to the input device with the lower housing 20 holding while viewing the imaged image (image imaged by the camera) displayed on the upper LCD 14.

Furthermore, in the vicinity of the camera 16 of the upper housing 22, the microphone 32 configured to input a sound is provided, and the game apparatus 10 can also be used as a recording device. In addition, the user performs a sound input over the microphone 32, and the game apparatus 10 can execute the game processing and application processing other than the game on the basis of the microphone input information as well.

Figure 5:
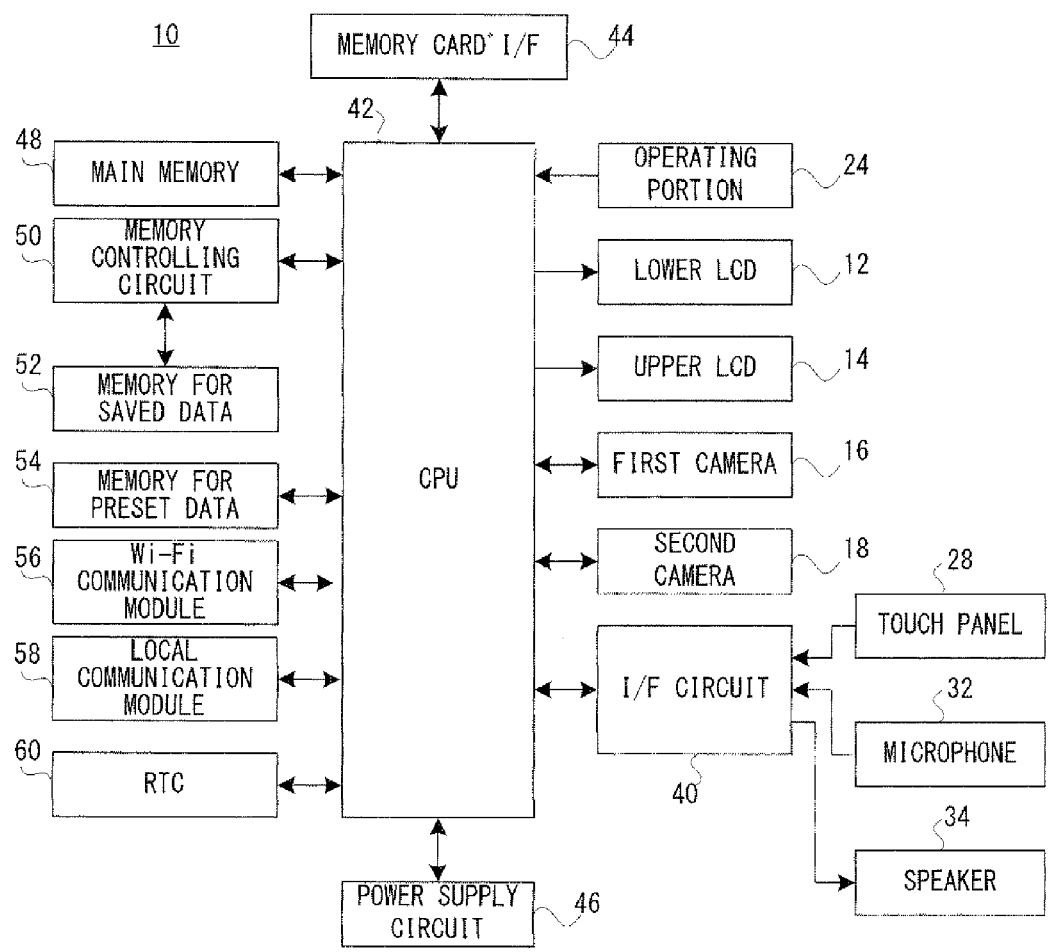
FIG. 5 is a block diagram showing one example of an electric configuration of the game apparatus.

FIG. 5 is a block diagram showing an internal configuration (electronic configuration) of the game apparatus 10. As shown in FIG. 5, the game apparatus 10 includes electronic components, such as a CPU 42, a main memory 48, a memory controlling circuit 50, a memory for saved data 52, a memory for preset data 54, a memory card interface (memory card I/F) 44, a Wi-Fi communication module 56, a local communication module 58, a real-time clock (RTC) 60, a power supply circuit 46, and an interface circuit (I/F circuit) 40, etc. Theses electronic components are mounted on an electronic circuit board, and housed in the lower housing 20 (or the upper housing 22 may also be appropriate).

The CPU 42 is an information processing means to execute various programs. In a case that the game apparatus 10 is utilized as an imaging device, the program for it is stored in the memory (memory for saved data 52, for example) within the game apparatus 10. The CPU 42 executes the program to allow the game apparatus 10 to function as an imaging device. Here, the programs to be executed by the CPU 42 may previously be stored in the memory within the game apparatus 10, may be acquired from the memory card 38b, and may be acquired from another appliance by communicating with this another appliance.

The CPU 42 is connected with the main memory 48, the memory controlling circuit 50, and the memory for preset data 54. Furthermore, the memory controlling circuit 50 is connected with the memory for saved data 52. The main memory 48 is a memory means to be utilized as a work area and a buffer area of the CPU 42. That is, the main memory 48 stores various data to be utilized in the game processing and the application processing, and stores a program obtained from the outside (memory cards 38, another appliance, etc.). In this embodiment, a PSRAM (Pseudo-SRAM) is used, for example, as a main memory 48. The memory for saved data 52 is a memory means for storing (saving) a program to be executed by the CPU 42, data of an image imaged by the respective cameras 16 and 18, etc. The memory for saved data 52 is configured by a non-volatile memory, such as a NAND type flash memory, for example. The memory controlling circuit 50 is a circuit for controlling reading and writing from and to the memory for saved data 52 according to an instruction from the CPU 42. The memory for preset data 54 is a memory means for storing data (preset data), such as various parameters, etc. which are previously set in the game apparatus 10. As a memory for preset data 54, a flash memory to be connected to the CPU 42 through an SPI (Serial Peripheral Interface) bus can be used.

The memory card I/F 44 is connected to the CPU 42. The memory card I/F 44 performs reading and writing data from and to the memory cards 38a and 38b attached to the connector according to an instruction from the CPU 42. In this embodiment, the image data imaged by the respective cameras 16 and 18 is written to the memory card 38a, and the image data stored in the memory card 38a is read from the memory card 38a and stored in the memory for saved data 52. Furthermore, the program and data stored in the memory card 38b is read and transferred to the main memory 48.

The Wi-Fi communication module 56 connects to a wireless LAN access point according to a standard complying with an IEEE802.11.b/g standard, for example, and has a function of making a Wi-Fi communication with another appliance (server 102, for example: see FIG. 6) via the Internet 110. Furthermore, the local communication module 58 has a function of making a short distance wireless communication with the game apparatus of the same kind according to a predetermined system (Bluetooth (registered trademark), ZigBee (registered trademark), Wibree (registered trademark), UWB (Ultra Wide Band), NFC (Near Field Communication), infrared rays system, etc., for example) with the same kind of apparatuses (short distance wireless communication performed between the same kind of the apparatuses utilizing the local communication module 58 is called "local communications" in this embodiment). The Wi-Fi communication module 56 and the local communication module 58 are connected by the CPU 42. The CPU 42 can transmit and receive data with another appliance (server 102, for example) via the Internet 110 by utilizing the Wi-Fi communication module 56 and can transmit and receive data with the same kind of other game apparatuses by utilizing the local communication module 58.

Here, the local communication module 58 is integrated in the game apparatus 10 of this embodiment, but may be provided in the memory card 38b, for example. In this case, the CPU 42 performs a communication control via the memory card I/F 44.

Additionally, the CPU 42 is connected with the RTC 60 and the power supply circuit 46. The RTC 60 counts a time to output the same to the CPU 42. The CPU 42 can calculate a time (date), and detects an operation timing as to when an image is to be acquired, etc on the basis of the time counted by the RTC 60. The power supply circuit 46 controls power supplied from the power supply (a battery accommodated in the lower housing) included in the game apparatus 10, and supplies the power to the respective circuit components within the game apparatus 10.

Moreover, the game apparatus 10 is provided with the microphone 32 and the speaker 34. The microphone 32 and the speaker 34 are connected to the I/F circuit 40. The microphone 32 detects a sound of the user and outputs a sound signal to the I/F circuit 40. The speaker 34 outputs a sound corresponding to the sound signal from the I/F circuit 40. The I/F circuit 40 is connected to the CPU 42. Furthermore, the touch panel 28 is connected to the I/F circuit 40. The I/F circuit 40 includes a sound controlling circuit for controlling the microphone 32 and the speaker 34, and a touch panel controlling circuit for controlling the touch panel 28. The sound controlling circuit performs an A/D conversion and a D/A conversion on a sound signal, or converts a sound signal into audio data in a predetermined format. The converted audio data is written to a sound area (not shown) of the main memory 48. If the game apparatus 10 is utilized as a recording device, the audio data stored in the sound area is written to the memory for saved data 52 via the memory controlling circuit 50 thereafter (recorded in the memory card 38a via the memory card I/F 44 as required). Furthermore, the audio data (microphone input information) stored in the sound area 80 is also utilized for various game processing. The touch panel controlling circuit generates touched position data in a predetermined format on the basis of the signal from the touch panel 28 and outputs the same to CPU 42. The touch position data indicates coordinates of a position where an input is performed on an input surface of the touch panel 28. Also, the touch panel controlling circuit performs reading of a signal from the touch panel 28 and generation of the touch position data per each predetermined time. The CPU 42 acquires the touch position data to thereby know the position where the input is made on the touch panel 28.

The operating portion 24 is made up of the aforementioned respective buttons 24a to 24i, and connected to the CPU 42. The operation data indicating an input state (whether or not to be pushed) with respect to each of the operation buttons 24a to 24*k* is output from the operation button 24 to the CPU 42. The CPU 42 executes processing according to an input to the operating portion 24 by acquiring the operation data from the operating portion 24.

The respective cameras 16 and 18 are connected to the CPU 42. The respective cameras 16 and 18 image images according to an instruction from the CPU 42, and output imaged image data to the CPU 42. The CPU 42 writes the image data from each of the cameras 16 and 18 to an image area (not shown) of the main memory 48. In a case that the game apparatus 10 is utilized as an imaging device, the image data stored in the image area is written to the memory for saved data 52 via the memory controlling circuit 50 (and moreover recorded in the memory card 38 via the memory card I/F 44 as required). Furthermore, the image data sorted in the image area can also be utilized for various game processing.

In addition, each of the LCDs 12 and 14 is connected to the CPU 42. Each of the LCDs 12 and 14 displays an image according to an instruction from the CPU 42. In a case that the game apparatus 10 is utilized as an imaging device, the CPU 42 displays an image acquired from any one of the cameras 16 and 18 on the upper LCD 14, and displays an operation screen generated according to predetermined processing on the lower LCD 12. If a game is played with the game apparatus 10, a game image is displayed on one or both of the LCD 12 and 14.

Figure 6:
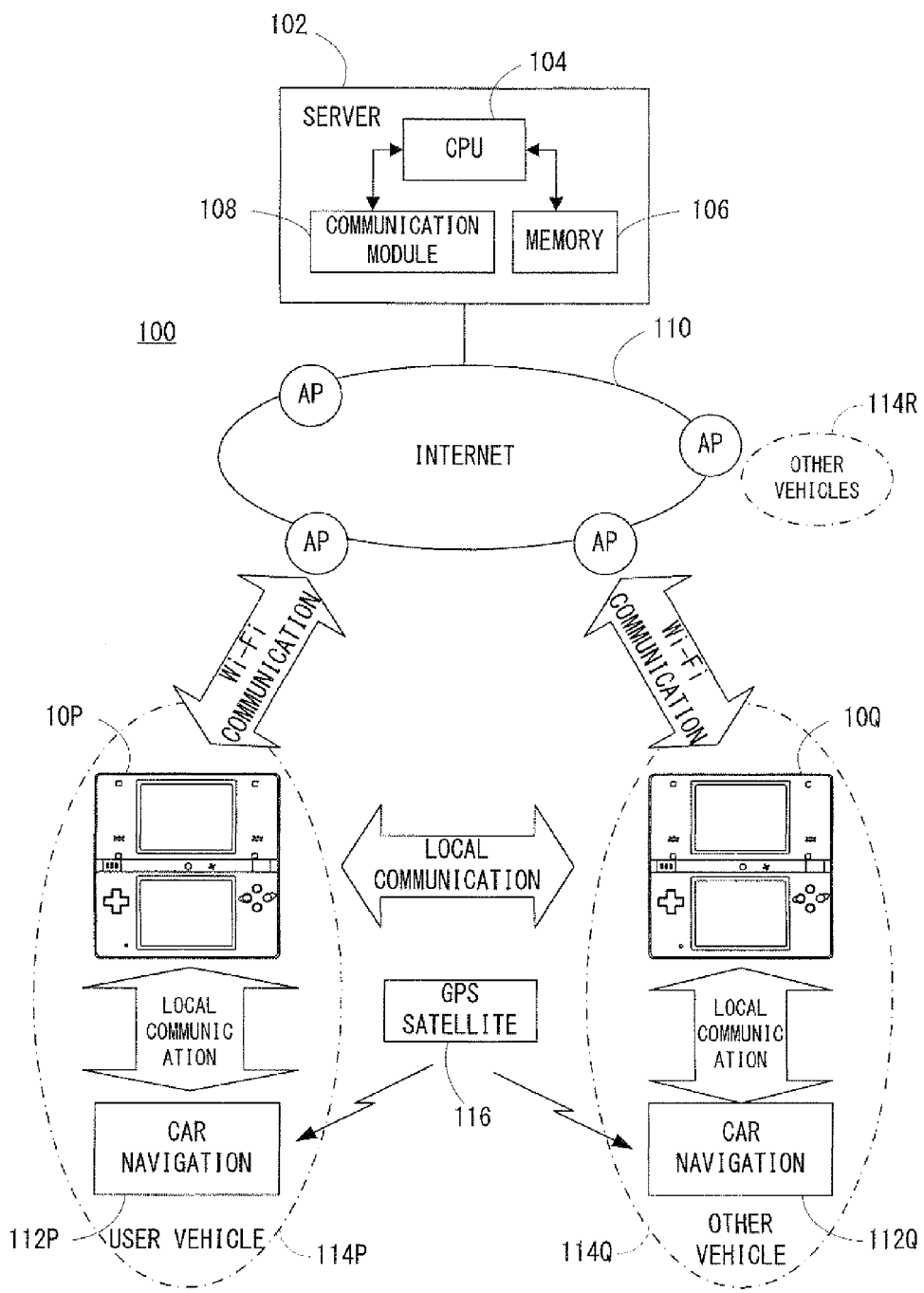
FIG. 6 is a block diagram showing a game system of one embodiment of the present invention, the game system including a plurality of game apparatuses (game apparatuses P, Q, . . . ) and a server.

FIG. 6 shows a configurational example of the game system 100 for driving with a character by utilizing the game apparatus 10 configured as described above. The game system 100 includes a plurality of game apparatuses 10P, 10Q, . . . each being configured similar to the above-described game apparatus 10 and the server 102 connected to the Internet 110.

The server 102 has a CPU 104, a memory 106, and a communication module 108. The Internet 110 is provided with a plurality of access points (AP), and each of the game apparatuses 10P, 10Q, . . . can performs Wi-Fi communications with the server 102 via the Internet 110 by connecting to any one of the APs. Furthermore, if any two of the game apparatuses, for example, the game apparatuses 10P and 10Q are close to each other, both of them can make local communications.

The game apparatus 10P is operated within a vehicle 114P attached with a car navigation 112P (sometimes referred to as a "user vehicle") by a user P (sometimes similarly referred to as a "user"). The game apparatus 10P and the car navigation 112P can make local communications with each other. The car navigation 112P has a function of detecting a position of the vehicle 114P on the basis of a signal from a GPS satellite 116. The car navigation 112P offers various kinds of information in relation to the car navigation, such as map information, route information, fuel information, hometown specialty information, good point information, etc. to the game apparatus 10P.

Similarly, the game apparatus 10Q is operated by a user Q (sometimes referred to as "other user" or "others") within a vehicle 114Q (sometimes referred to as "other vehicle") attached with a car navigation 112Q. The game apparatus 10Q and the car navigation 112Q can make local communications with each other. The car navigation 112Q has a function of detecting a position of the vehicle 114Q based on a signal from the GPS satellite 116. The car navigation 112Q further offers various kind of information in relation to the car navigation, for example, map information, route information, fuel information, hometown specialty information, good point information, etc. to the game apparatus 10Q.

Figure 7:
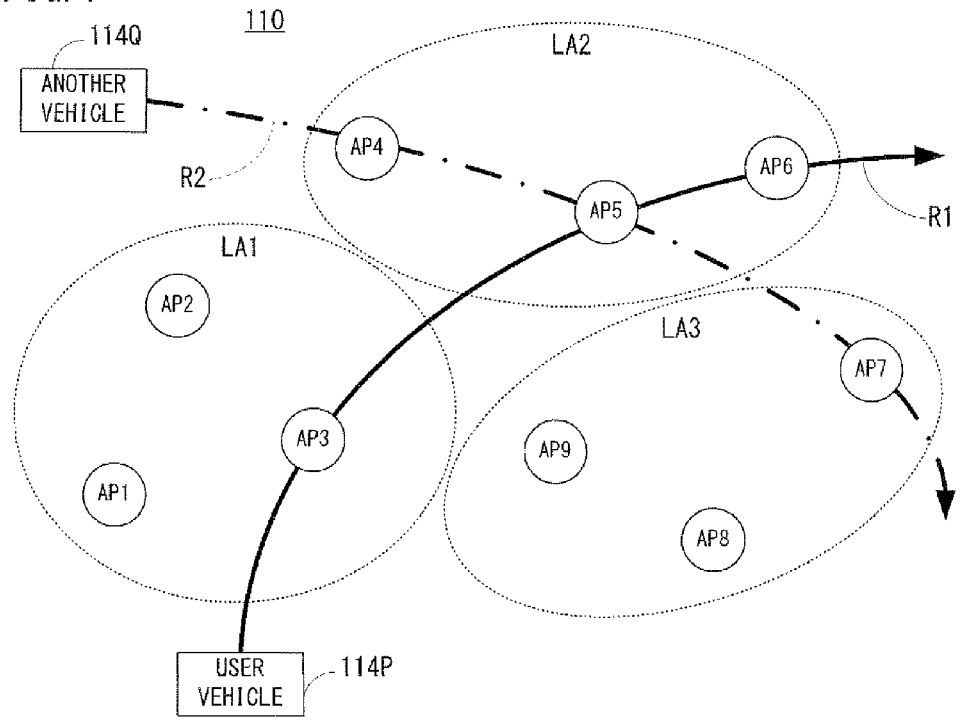
FIG. 7 is an illustrative view showing an arrangement example of access points (AP) to the Internet that are located between the game apparatus and a server, and a positional relationship between a driving route of the vehicle having the game apparatus and each of the APs.

FIG. 7 shows arrangement of APs in a certain district (by prefectures, for example). The district includes local areas LA1 to LA3 (municipal unit, for example), in the local area LA1, AP1 to AP3 are arranged at appropriate intervals, in the local area LA2, AP4 to AP6 are arranged at appropriate intervals, and in the local area LA3, AP7 to AP9 are arranged at appropriate intervals.

More specifically, in this district, two express highways R1 and R2 that crosses with each other pass through, and the AP3, the AP5 and the AP6 are provided within service areas along the express highway R1, and the AP4, the AP5 and the AP7 are provided within service areas along the express highway R2 (AP5 is an establishment shared by both of the highways). The other APs (1, 2, 8 and 9) are set in roadside stations along general roads, convenience stores, fast food shops, or the like.

The user P gets into the user vehicle 114P with the family to drive on the express highway R1 while carrying the game apparatus 10P. At this time, if "DRIVE WITH CHARACTER" is activated by the game apparatus 10P, it is possible to take a virtual character imitating each member of the family on the drive. In other words, in simultaneously parallel with the drive in the actual world, the characters drive within the virtual space implemented by the game apparatus 10P.

Similarly, the user Q gets into the other vehicle 114Q with the family to drive on the express highway R2 while carrying the game apparatus 10Q. At this time, if "DRIVE WITH CHARACTER" is activated in the game apparatus 10Q, it is possible to take a virtual character imitating each member of the family on the drive. In other words, in simultaneously parallel with the drive in the actual world, the characters drive within the virtual space implemented by the game apparatus 10Q.

Furthermore, in the drive within the virtual space, a character of a person who does not participate in the drive in the actual world can be participated. For example, within the virtual space by the game apparatus 10P, a character on the side of the user Q can be picked up by the user vehicle 114P. Similarly, within the virtual space by the game apparatus 10Q, a character on the side of the user P can be picked up by the other vehicle 114Q.

In this case, the character transfer between the game apparatuses 10P and 10Q is performed by utilizing local communications in a state that the game apparatuses 10P and 10Q are brought to close to each other. For example, in a case that the character on the side of the user Q is picked up by the user vehicle 114P, character data of the character picked up is directly transferred from the game apparatus 10Q to the game apparatus 10P. After going back from the drive, the character data of the character picked up is directly returned, from the game apparatus 10P to the game apparatus 10Q. Similarly, in a case that the character on the side of the user P is picked up by the other vehicle 114Q, character data of the character picked up is directly transferred from the game apparatus 10P to the game apparatus 10Q. After going hack from the drive, the character data of the picked up character is directly returned from the game apparatus 10Q to the game apparatus 10P.

Here, it is possible to make a character transfer between the game apparatuses that are far apart from each other by the Wi-Fi communications via the Internet 110. In this case, the two game apparatuses which perform a character transfer are required to be connected to any one of the APs.

In addition, a hitchhiker character can be participated in the drive within the virtual space as a character of a person who does not participate in the drive of the actual world. Hitchhiker character data is character data released from each of the game apparatuses 10P, 10Q . . . to each AP as a connection destination, and consolidated by the server 102.

For example, when the game apparatus 10Q is connected to the AP5, and hitchhiker character data is transmitted from the game apparatus 10Q, the server 102 stores the hitchhiker character data in the memory 106. Thereafter, when the game apparatus 10P is connected to the AP5, the hitchhiker character data stored in the memory 106 is transferred from the AP5 to the game apparatus 10P. Thus, within the virtual space, the hitchhiker is released from the other vehicle 114Q to the AP5, and the released hitchhiker is consequently picked up by the user vehicle 114P which passes by the AP5 thereafter. The character which is thus picked up by the user vehicle 114P in the AP5 is dropped off in another AP, and picked up by another vehicle 114B which passes by the AP. Thereafter, the hitchhiker character moves between the APs by repetitively hitchhiking.

Figure 8:
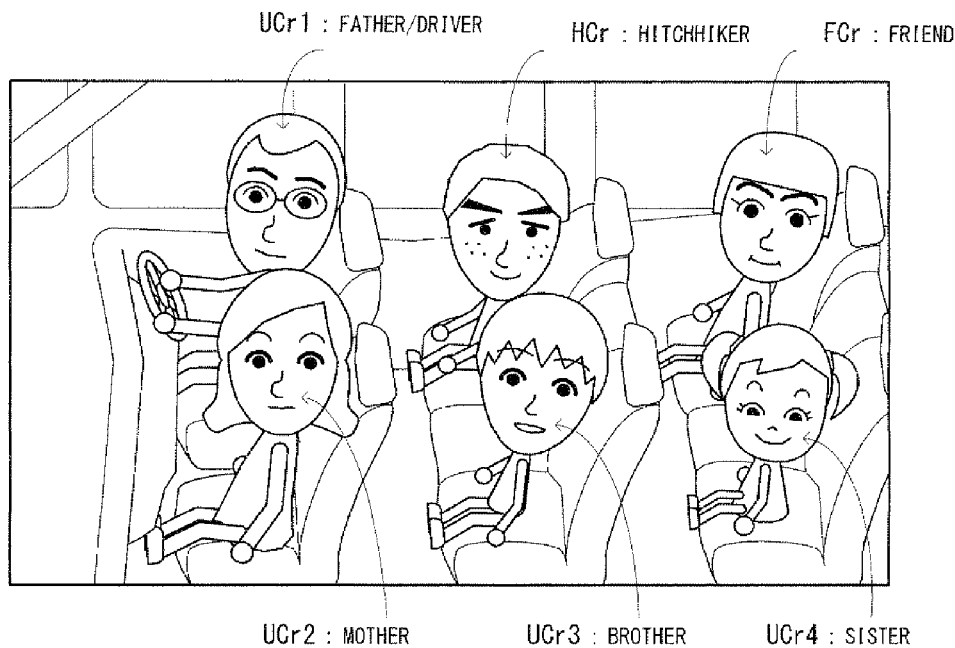
FIG. 8 is an illustrative view showing a virtual in-vehicle space implemented by the game apparatus.

Now, in the actual world, the user P shall drive with his or her family (four family members of father, mother, brother and sister, for example). FIG. 8 shows one example of the in-vehicle of the user vehicle 114P which drives in simultaneously parallel. In this example, inside the user vehicle 114P, in addition to the characters UCr 1 to UCr 4 (specifically, a user character UCr 1 corresponding to the father, a user character UCr 2 corresponding to the mother, a user character UCr 3 corresponding to the brother, and a user character UCr 4 corresponding to the sister) corresponding to the four family members, a friend character FCr and a hitchhiker character HCr corresponding to the above-described characters picked up ride.

The arrangement of the seats of the user characters UCr 1 to UCr 4 corresponds to the arrangement of the seats of the four family members in the actual world. That is, in the actual world, the father sits in a driver's seat, the mother sits in a front passenger seat, the brother sits in a first row of the left of rear seats, and the sister sits in a second row of the left of the rear seats. The seats in which the friend character FCr and the hitchhiker character HCr sit, that is, the first row of the right of the rear seats and the second row of the right of the rear seats are vacant seats in the actual world.

As a character, one created in advance by utilizing a console-type game apparatus (not illustrated), a PC, etc. is utilized. The user characters UCr 1 to UCr 4 are stored in the game apparatus 10P in advance. The friend character FCr is captured from the game apparatus 10Q into the game apparatus 10P directly, that is, via local communications before start of the drive. The friend character FCr thus captured into the game apparatus 10P is directly returned to the game apparatus 10Q when going back from the drive. On the other hand, the hitchhiker character HCr is one which is transferred from the game apparatus 10Q which is connected to the access point AP5, for example, to the server 102 via the Internet 110 (dropped off from the other vehicle 114Q at the AP5 within the virtual space), and captured from the server 102 to the game apparatus 10P when the game apparatus 10P is then connected to the access point AP5 (picked up by the user vehicle 114P at the AP5). The hitchhiker character HCr thus captured is transferred to the server 102 again when the game apparatus 10P is connected to another AP, for example, AP6, and captured from the server 102 to the game apparatus when still another game apparatus is thereafter connected to the access point AP6. After such a travel by hitchhike, the hitchhiker character HCr is finally returned to the original game apparatus Q.

To each character, a movement log recording each of the points along the moving course of the vehicle 114 into which the own character gets and a time of passing are attached. The game apparatus 10P can create a character diary as shown in FIG. 9, for example, and can give a travel quiz by displaying a screen as shown in FIG. 10 by using the movement log.

Figure 9:
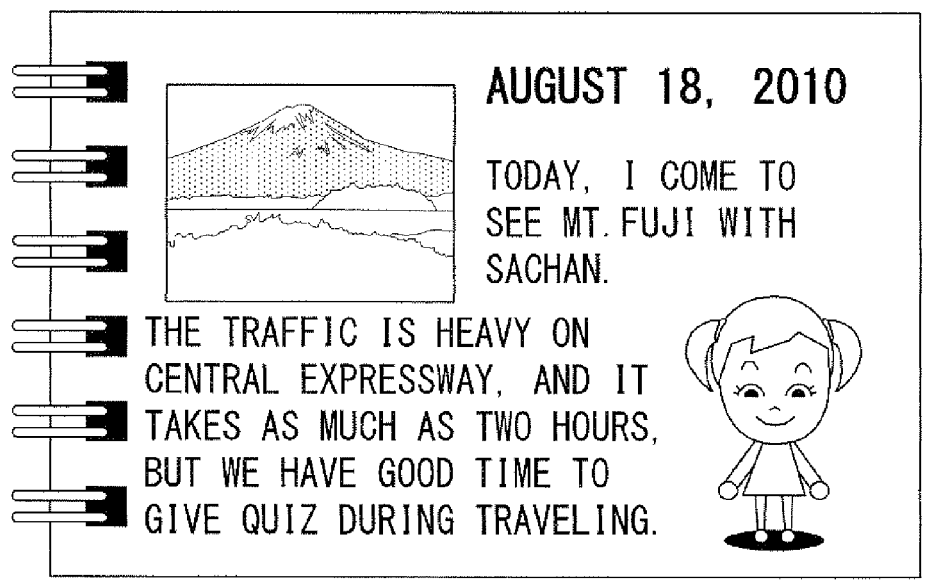
FIG. 9 is an illustrative view showing one example a display screen (character diary) of the game apparatus.
Figure 10:
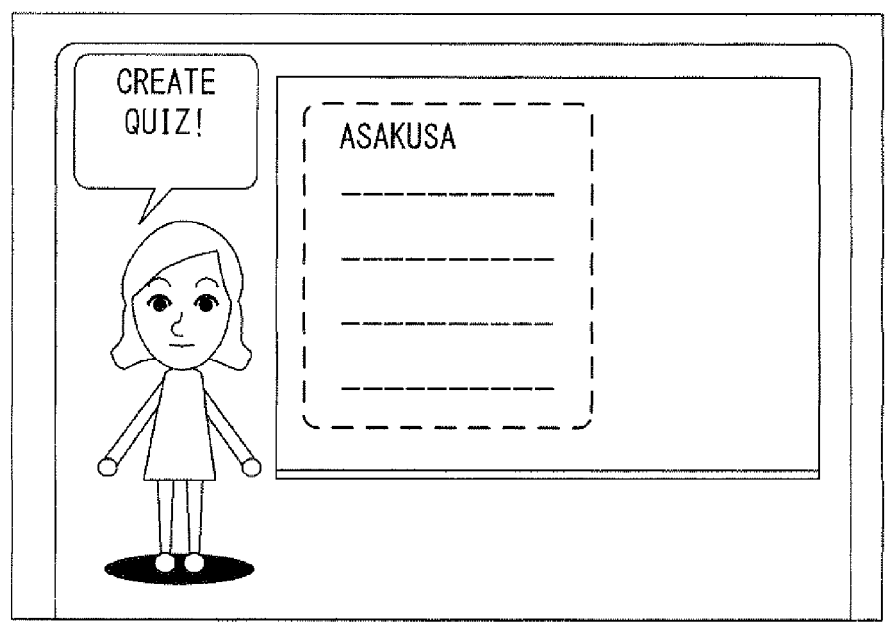
FIG. 10 is an illustrative view showing another example of a display screen (travel quiz creating screen) of the game apparatus.

Specifically, the character diary in FIG. 9 is a diary by the user character UCr 4 (sister), and in the character diary of FIG. 9, a topic, such as a date of the drive (Aug. 18, 2010), a destination thereof (the Mt. Fuji), a friend (Satchan) picked up, an event occurring during the drive (traffic jam, quiz) is depicted, and an image of the character (sister character UCr 4) which creates this and an image photographed during the drive (photograph of a landscape of the Mt. Fuji) are also attached.

The game apparatus 10P records information on the date of the drive, the destination, the event, the participant, etc. as drive data (see FIG. 18(A): described later), and the topic is created with reference to the drive data, etc. Specifically, in selection of the topics, an attribute (relationship, age, gender, etc.) of the character is considered (see FIG. 16(A): described later). Furthermore, a different expression is adopted depending on the attribute of the character (see FIG. 14: described later).

Then, such a character diary is created by the friend character FCr and the hitchhiker character HCr which return to the original game apparatus 10Q as well as by the user character in the game apparatus 10P.

Furthermore, whereas the game apparatus 10P rides the friend character FCr to drive, and picks up the hitchhiker character HCr during the drive, the own user character UCr can be taken to the drive by the game apparatus 10Q as a friend character FCr, and can be made into the hitchhiker character HCr to travel all around the world. The character returns to the game apparatus 10P after such a drive and a travel by hitchhike writes down events while traveling in the diary, gives a quiz in relation to the travel and the tourist spot, etc., and shows a souvenir and specialty obtained while traveling on the basis of the movement log.

Thus, each user can know the information beyond the moving range of his or her own, and can feel as if he or she travels.

On the travel quiz creating screen shown in FIG. 10, images of a character (mother character UCr 2) being a creator (questioner) and a dialogue "PLEASE CREATE QUIZ", and an image of a piece of paper are displayed. In the piece of paper within the screen, in response to a letter input to the touch panel 28, letters indicating the quiz are described. To the travel quiz thus created, information for designating an area is attached. The travel quiz attached with designated area is brought when the questioner or another user character takes a drive with another family (picked up by the other vehicle 114Q as a friend character FCr), for example for giving a quiz at a time of arriving at the designated area.

Figure 11:
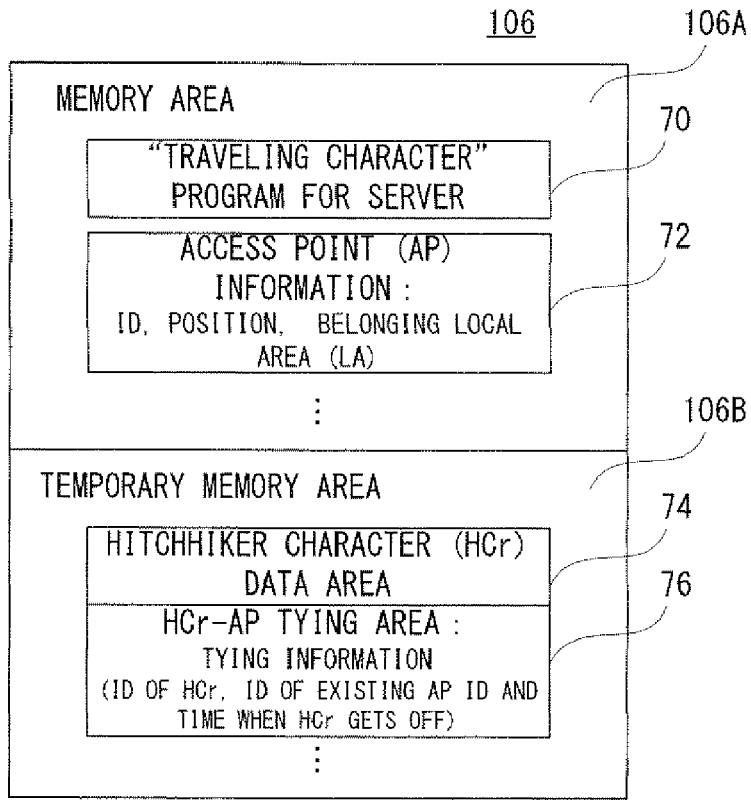
FIG. 11 is an illustrative view showing a part of a memory map of the server.

FIG. 11 shows a memory map of the server 102. The memory 106 includes a save area 106A and a temporary memory area 106B, and in the save area 106A, a "traveling character program" for server 70 and AP information 72 are stored. The "traveling character program" for server 70 is a program for controlling a transfer of hitchhiker character data (hereinafter referred to as "HCr data") between the respective game apparatuses 10 (10P, 10Q, . . . ), and corresponds to a processing flowchart in FIG. 19 and FIG. 20. The AP information 72 is information indicating the arrangement of the APs in all over the nation, and includes information relative to an ID, a position (coordinates) and a local area (LA1, LA2, . . . ) to which each AP belongs as to each of the APs.

The temporary memory area 106B includes an HCr data area 74 and an HCr-AP tying area 76. In the HCr data area 74, the HCr data transferred from each of the game apparatuses 10 is stored. In the HCr-AP tying area 76, HCr-AP tying information for tying the ID of each HCr stored in the HCr data area 74 with the ID of the AP in which the HCr exists is stored. That is, in the HCr-AP tying information, as to each HCr stored in the HCr data area 74, a character ID, an ID of the AP in which the HCr exists and a time (a time when the HCr drops off at the AP) are described.

Figure 12:
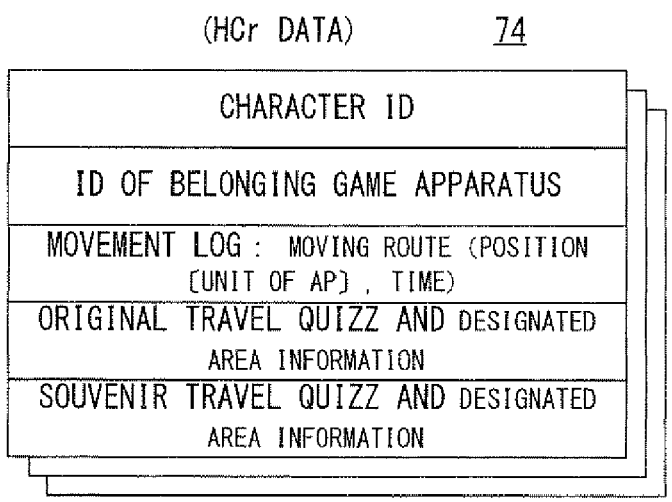
FIG. 12 is an illustrative view showing a configuration example of hitchhiker character (HCr) data stored in the server.

The HCr data of the HCr data area 74 includes a character ID, an ID of a belonging game apparatus, a movement log, an original travel quiz and a souvenir travel to each HCr quiz as shown in FIG. 12. Each HCr data is arranged in chronological order (the order of the transfer).

The movement log indicates a position and a time of each of the points along the moving course of the HCr. The position in this case is based on an AP. That is, in the movement log included in the HCr data, coordinates (latitude/longitude) and times as to a series of APs in which the HCr gets on or off are recorded. In other words, in the HCr, the position and the time of each AP in which the HCr has ever got on or off is added as a movement log. The coordinates of each AP is specified by searching the AP information 72 with the ID of the AP.

The original travel quiz is a travel quiz created in the game apparatus 10 to which the HCr belongs. The souvenir travel quiz is a travel quiz created in the game apparatus 10 by which the HCr is picked up, and is brought back in exchange for the brought original travel quiz as a souvenir. Each of the original travel quiz and the souvenir travel quiz is attached with designated area information for designating where the quiz is to be given (local area LA1, LA2, . . . , for example).

FIG. 13 shows a memory map of each game apparatus 10 (10P, 10Q, . . . ). FIG. 13(A) is a memory map of the memory for saved data 52, and FIG. 13(B) is a memory map of the main memory 48.

First, with reference to FIG. 13(A), in the memory for saved data 52, a "DRIVE WITH CHARACTER" program 80, an "expression" database (hereinafter referred to as "DB") 82a and a "preferential topic" DB 82b, etc. are stored. The "DRIVE WITH CHARACTER" program 80 is a main program for implementing the "DRIVE WITH CHARACTER" as described above, and corresponds to processing flowchart in FIG. 21 to FIG. 28. In the "DRIVE WITH CHARACTER" program 80, a "traveling character" program 80a as a counter part of the aforementioned traveling character program" for serve 70 is included as a sub program. The "traveling character" program 80a is a program for controlling a transfer of the HCr data with the server 102, and corresponds to a processing flowchart in FIG. 23 and FIG. 24.

The "expression" DB 82a is a database for varying an expression to be used in the character diary depending on the attribute of the character, and as shown in FIG. 14, expressions, such as "-だったな" (Japanese Hiragana (Dattana): frank and narrative expression, "-だったよ" (Japanese Hiragana (Dattayo): frank and informative expression) are registered for each attribute (relationship), such as "father/grandfather", "brother/sister", etc.

The "preferential topic" DB 82b is a database for varying the topic to be taken in the character diary depending on the attribute of the character, and a preferential topic, such as "navigation", "destination, game" is registered as for each attribute, such as a "driver", "children" (sitting seat position, age, relationship, etc.) as shown in FIG. 15.

Next, referring to FIG. 13(B), the main memory 48 includes an UCr data area 84, an FCr data area 86, an HCr data area 88, a movement log area 90, a drive data area 92, an event recording area 94, a travel quiz data area 96, a diary data area 98, etc.

In the UCr data area 84, UCr data as shown in FIG. 16(A) is stored. The UCr data describes a character ID, a character image and an attribute (relationship, such as a father, a mother, a brother, . . . ) as to each UCr.

In the FCr data area 86, FCr data as shown in FIG. 16(B) is stored. The FCr data describes a character ID, an ID of the belonging game apparatus, a movement log, an original travel quiz and a souvenir travel quiz as to the FCr picked up by the vehicle 114. The movement log indicates a position and a time as to each of the points along the moving course of the FCr. The position in this case is based on a measured point according to a signal from the GPS satellite 116. That is, in the movement log included in the FCr data, a series of coordinates (latitude/longitude) indicating the measured points by the GPS along the moving course of the FCr are recorded. The recording of the movement log is based on the movement log (see FIG. 17: described later) of the vehicle 114 stored in the movement log area 90. The other elements are information similarly to that described in FIG. 12.

In the HCr data area 88, the HCr data as shown in FIG. 16(C) is stored. The HCr data describes a character ID, an ID of a belonging game apparatus, a movement log, an original travel quiz and a souvenir travel quiz as to the HCr picked up by the vehicle 114. These elements are information similar to that described in FIG. 12.

In the movement log area 90, a movement log as shown in FIG. 17 is stored. The movement log is a log recording a position and a time as to each measured point by the GPS. The position is represented by coordinates like the latitude/longitude, etc. Here, recording the positions and the times of all the measured points results in massive amounts of data, and therefore, recording by thinning out is preferable.

In the drive data area 92, drive data as shown in FIG. 18(A) is stored. In the drive data, data in relation to the various items, such as a date and time, a destination, an event, a driving time, an off-route driving time, an average fuel, and an arrangement of the seats of the character are recorded. The date and time data is a record indicating a date and time of the drive, specifically a date and a starting/ending time, and obtained from the car navigation 112. The destination data is a record indicating a destination of the drive, and obtained from the car navigation 112. The event data is a record indicating an event occurring in the driving, and a part of the event data is created by the own game apparatus 10, and the other part thereof is obtained from the car navigation 112. The driving time data is an accumulative time of the actual driving during the drive, and is obtained from the car navigation 112. The off-route driving time data is an accumulative time during which driving off the route is performed during the driving (that is, loses one's way), and is obtained from the car navigation 112. The average fuel data is an average fuel during the driving, and is obtained from the car navigation 112. The seat arrangement data of the character is data indicating which seat each character is arranged during the driving, and is generated by the game apparatus 10 itself on the basis of an operation by the user.

Here, as described above, the game apparatus 10 creates drive data in conjunction with the car navigation 112, but the share between them at this time may be appropriately changed without being restricted to the aforementioned example.

In the event recording area 94, events to be written to the aforementioned drive data are recorded. In FIG. 18(B), the form of the event data recorded in the event recording area 94 is shown. The event data is made up of an "event" indicating individual events, a "category" indicating the kind or the attribute of the event, and an "element" indicating a specific content. For example, when an operation of setting or changing a destination is performed on the game apparatus 10 (or the car navigation 112), a "destination setting/change" is recorded as an event, a "destination" is recorded as a category, and a "destination name, coordinates, an operation time, and an operator name", etc. are recorded as elements. When an operation of setting or changing the arrangement of the seats is performed on the game apparatus 10, a "seat setting/change" is recorded as an event, a "base" is recorded as a category, a "seat arrangement, a time when an operation is performed, and an operator name", etc. are recorded as elements.

Furthermore, when a game is performed by using the game apparatus 10, a "game" is recorded as an event, a "game" is recorded as a category, a "game name, a playing time, a participant name, and an rank", etc. are recorded as elements. When a quiz is given by using the game apparatus 10, a "quiz" is recorded as an event, a "game" is recorded as a category, a "quiz name, participant name, and correct/incorrect as to each quiz", etc. are recorded as elements.

In addition, when a traffic jam is detected by the car navigation 112, a "traffic jam" is recorded as an event, "navigation" is recorded as a category, and a "place of encounter, degree, duration time", etc. are recorded as elements. When an audio instrument is operated through the car navigation 112 or the game apparatus 10, an "operation of the audio instrument" is recorded as an event, "navigation" is recorded as a category, an "instrument name, a content of an operation, a time when an operation is performed, an operator name", etc. are recorded as element.

Here, in FIG. 18(B), as an event to be recorded, the events in the actual world to be detected by the game apparatus 10 or the car navigation 112 are illustrated, but events (an encounter with HCr and exchanges with a character in each local area, for example) in the virtual space can also be recorded.

In the travel quiz data area 96, data in relation to an original travel quiz created by the game apparatus 10 itself and a souvenir travel quiz that the FCr and the HCr bring back from another game apparatus (10Q, 10R, . . . ) are stored. To each travel quiz, the designated area information indicating an area (local areas LA1, LA2, . . . , for example) where the quiz is to be given, the date of the drive, the character ID, etc. are attached.

In the diary data area 98, data in relation to the character diary created by the character which goes back from the drive is stored. In each character diary, a date of the drive, a character ID, etc. are attached.

Figure 19:
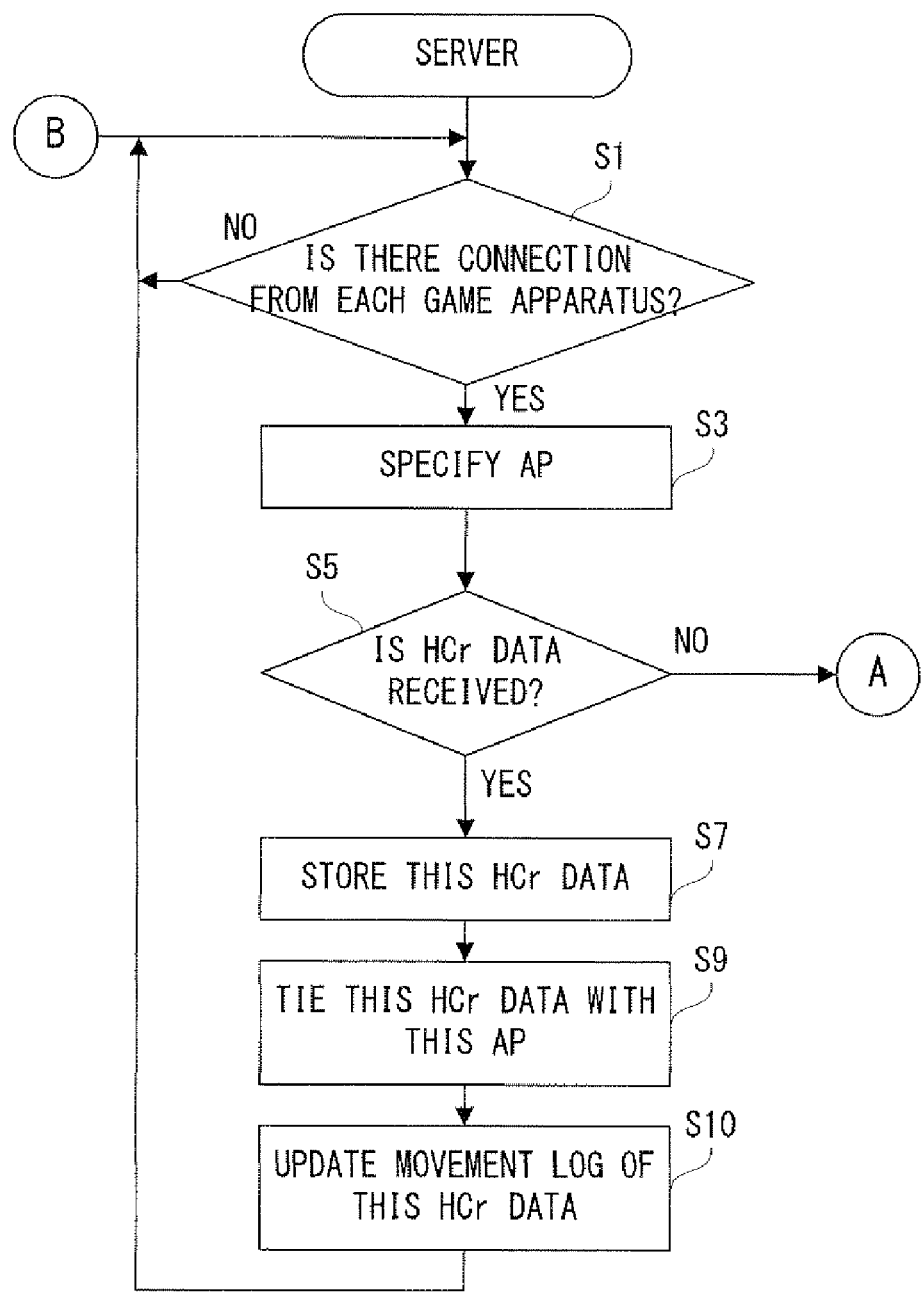
FIG. 19 is a flowchart showing a part of an operation by the CPU of the server.
Figure 20:
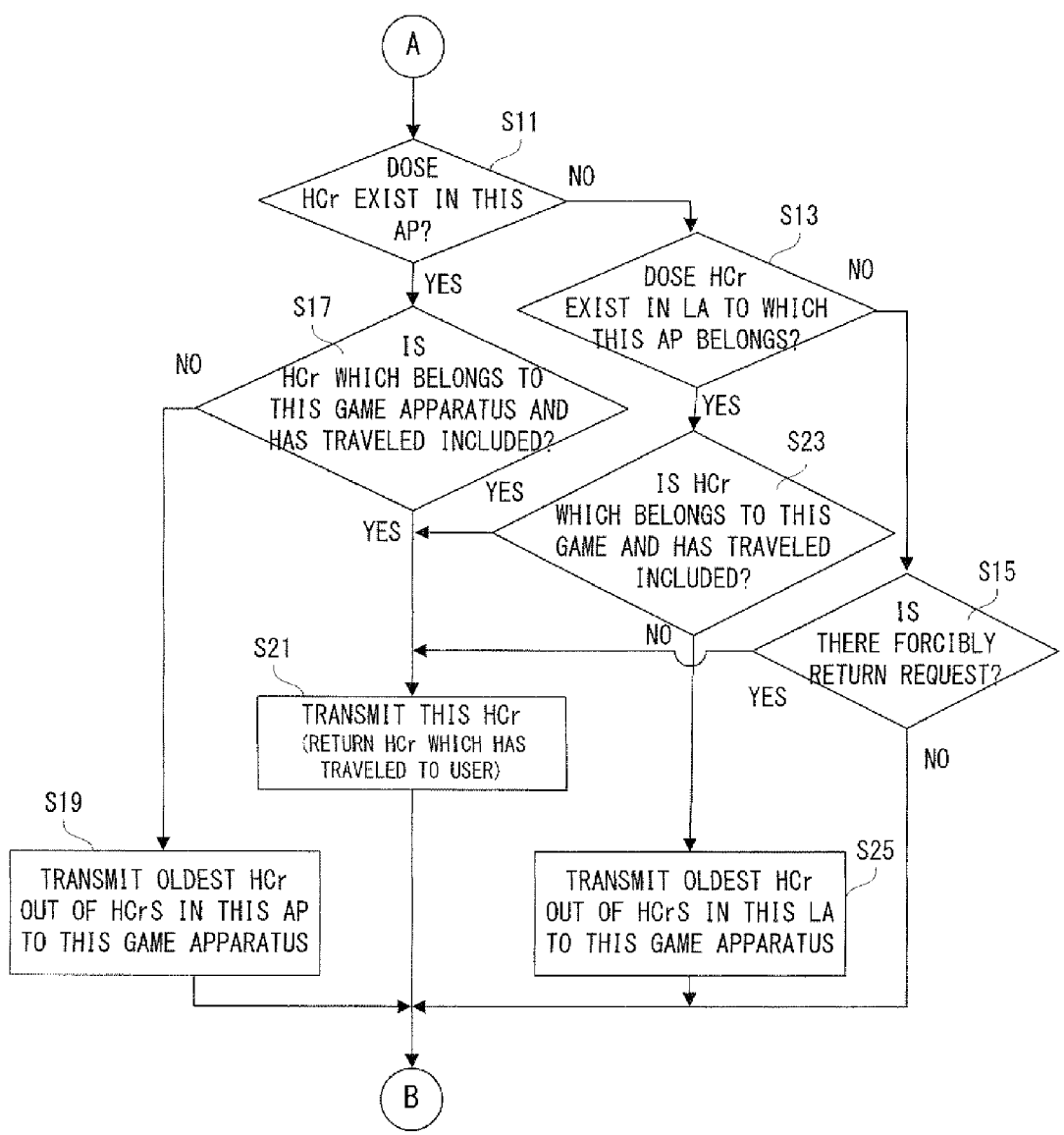
FIG. 20 is a flowchart showing another part of the operation by the CPU of the server.

The CPU 104 of the server 102 executes processing according to a flowchart shown in FIG. 19 and FIG. 20 based on the programs and the data (FIG. 11 and see FIG. 12) stored in the memory 106. First, referring to FIG. 19, in a first step S1, it is determined whether or not there is a connection from each game apparatus 10 (10P, 10Q, . . . ), and if "NO", similar determinations are repeated by inserting predetermined waiting times. If "YES" in the step S1, the process proceeds to a step S3 to specify an AP to which the game apparatus is connected. Then, in a step S5, it is determined whether or not the HCr data is received, and if "NO", the processing is branched into a step S11 (described later).

If "YES" in the step S5, the HCr data is stored in the HCr data area 74 in a step S7, and is tied to the AP in a step S9. The result of tying is reflected on the tying information stored in the HCr-AP tying area 76. More specifically, the character ID of the HCr, the ID of the AP, and the time (that is, the time when the HCr gets off at the AP within the virtual space) when the HCr data is transferred from the AP are written to the HCr-AP tying area 76 as current tying information.

Then, in a step S10, the movement log of the HCr data stored in the HCr data area 74 is updated. More specifically, by searching the AP information 72 with the ID of the AP, the position (coordinates) of the AP is specified, and the position and the aforementioned time are additionally written to the movement log. Thereafter, the process returns to the step S1 to repeat the similar processing to the above description.

Next, referring to FIG. 20, in a step S11, it is determined whether or not an HCr exists in the AP, and if "NO" here as well, the process shifts to a step S13 to further determine whether or not the HCr exists in the local area (LA1, LA2, . . . : see FIG. 7) to which the AP belongs. If "NO" here as well, the process shifts to the step S15 to determine whether or not there is a forcibly return request (request of forcibly returning the HCr to the game apparatus 10), and if "NO" here, the process returns to the step S1 to repeat the similar processing to the above description.

If "YES" in the step S11, the process proceeds to a step S17 to determine whether or not the HCr which belongs to the game apparatus 10 and has traveled is included out of the HCrs in the AP. If "NO" here, the oldest HCr out of the HCrs in the AP is transferred to the game apparatus 10 in a step S19. After transferring, the process returns to the step S1 to repeat the processing similar to the above description. If "YES" in the step S17, the HCr which has traveled is transferred to the game apparatus 10 (that is, belonging game apparatus 10) in a step S21. Thus, the character which travels by hitchhike within the virtual space returns to the user. After transferring, the process returns to the step S1 to repeat the processing similar to the above description.

If "YES" in the step S13, the process proceeds to a step S23 to determine whether or not the HCr which belongs to the game apparatus 10 and has traveled is included out of the HCrs in the local area. If "NO" here, the oldest HCr out of the HCrs in the local area is transferred to the game apparatus 10 in a step S25. After transferring, the process returns to the step S1 to repeat the processing similar to the above description. If "YES" in the step S23, the process shifts to the aforementioned step S21 to transfer the HCr which traveled to the game apparatus 10. After transferring, the process returns to the step S1 to repeat the processing similar to the above description.

Thus, in a case that there is no HCr in the noting AP, a detection range of the HCr is extended to the local area (that is, adjacent APs) to thereby speed up the movement of the HCr, capable of enhancing interest of the "traveling character".

If "YES" in the step S15, the process shifts to the aforementioned step S21 to transfer an HCr which exists in an area different from the local area, and has traveled to the game apparatus 10 (that is, the belonging game apparatus 10). This makes it possible to forcibly returning the character which does not come back from the travel by hitchhike to the user. After transferring, the process returns to the step S1 to repeat the processing similar to the above description.

The CPU 42 of each game apparatus 10 (10P, 10Q, . . . ) executes processing according to the flowcharts shown in FIG. 21 to FIG. 28 on the basis of the programs and data (see FIG. 13 to FIG. 18) stored in the main memory 48 and the memory for saved data 52. Here, the description below is made mainly on the game apparatus 10P, and the game apparatus 10P is simply called a "game apparatus 10". In a case that individual game apparatuses 10 need to be identified, or in a case that components shared with game apparatuses need to be identified from one another, a subscript P, Q, . . . is attached after the reference numeral.

Figure 21:
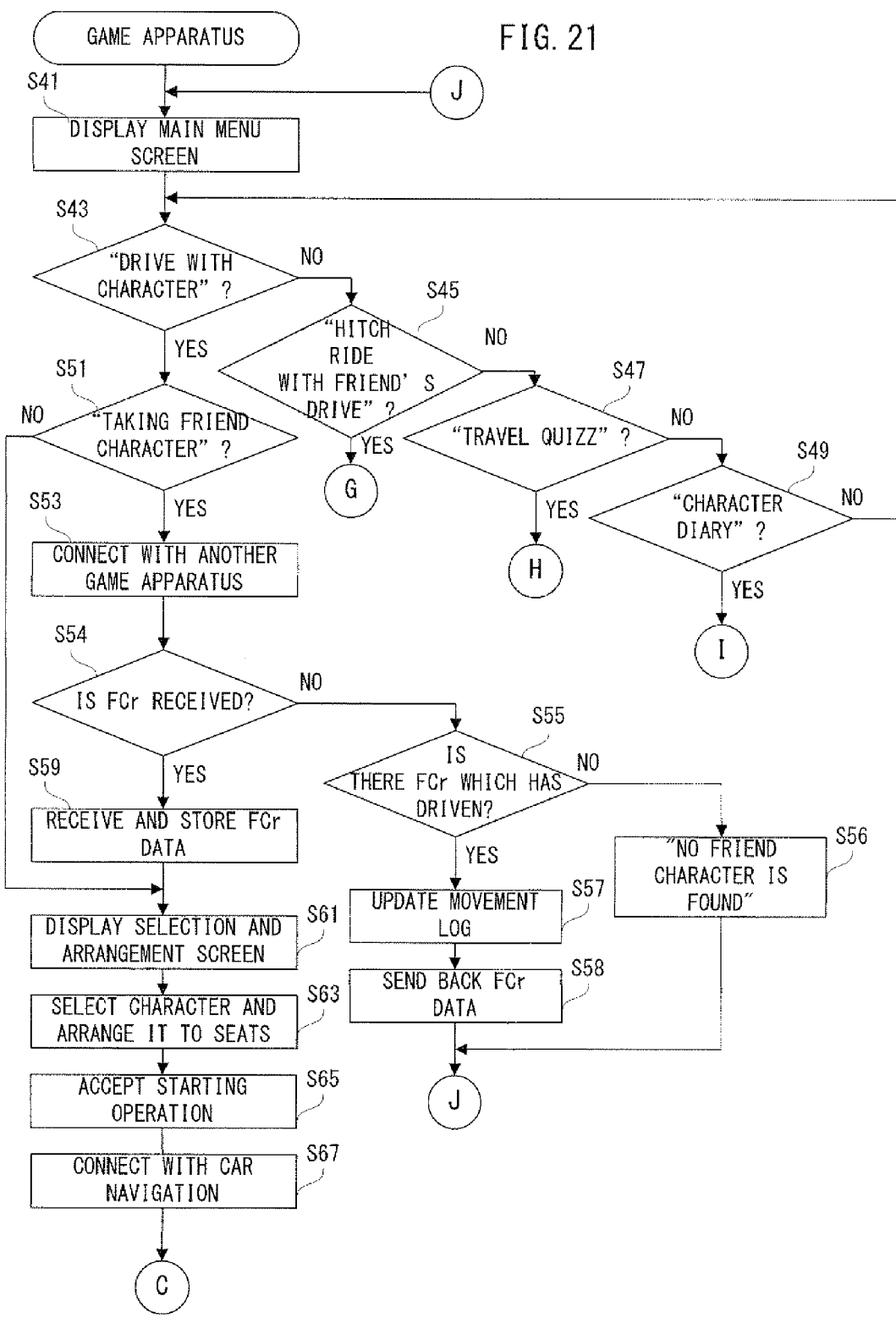
FIG. 21 is a flowchart showing a part of an operation by the CPU of the game apparatus.

First, with reference to FIG. 21, in a first step S41, a main menu screen as shown in FIG. 29(A) is displayed on the LCD 12 attached with touch panel 28. The main menu screen includes a button B1 indicating "DRIVE WITH CHARACTER", a button B2 indicating "TAKING FRIEND AS WELL", a button B3 indicating "HITCH RIDE WITH FRIEND'S DRIVE", a button B4 indicating "TRAVEL QUIZ", and a button B5 indicating "CHARACTER DIARY". At the beginning, only buttons B1, B3 to B5 are active, and the button B2 becomes active when the button B1 is selected.

Next, it is determined whether or not any one of the buttons B1, B3 to B5 is pushed on the basis of an output from the touch panel 28 in steps S43 to S49. If "YES" in the step S43, the process proceeds to a step S51 to further determine whether or not the button B2 is pushed. If "NO" in the step S51, the process proceeds to a step S61. If "YES" in the step S51, a connection is made with another game apparatus 10Q via local communications in a step S53 and it is determined whether or not an FCr is received from the other game apparatus 10Q in a step S54. If "NO" in the step S54, the process shifts to a step S55 to further determine whether or not the FCr which has driven is stored in the FCr data area 86, and if "NO" here as well, an error message, "NO FRIED CHARACTER IS FOUND", for example, is displayed in a step S56, and the process returns to the step S41.

If "YES" in the step S55, the process proceeds to a step S57 to update the movement log of the FCr (see FIG. 16(B)) on the basis of the movement log (see FIG. 17) of the movement log area 90 (see FIG. 13(B)), and the FCr data is transmitted to the opponent, that is, the other game apparatus 10Q in a step S58. Thus, the FCr of the opponent finally brings back the movement history of the user vehicle 114P by which it is picked up.

Here, after completion of the step S53, it is determined whether or not the connection is successful. If "YES", the process proceeds to the step S54, and if "NO", an error message "NO FRIED CHARACTER IS FOUND", for example, is displayed, and the process may return to the step S41.

If "YES" in the step S54, the FCr data is received from the other game apparatus 10Q, and stored in the FCr data area 86 (see FIG. 13(B)) in a step S59, and the process proceeds to a step S61.

In the step S61, a selection and arrangement screen as shown in FIG. 29(B) is displayed on the LCD 12. The selection and arrangement screen includes icons Cr1, Cr2, . . . indicating each character to be taken to the drive, that is, the UCr and the FCr and a seating list Sm. In a next step S63, an operation of selecting a character and arranging it is accepted, and the seat arrangement is recorded in the drive data (see FIG. 18(A)) of the drive data area 92 (see FIG. 13(B)). Then, after a drive starting operation is accepted in a step S65, a connection is made with the car navigation 112 through the local communication in a step S67, and the process proceeds to a step S69.

Figure 22:
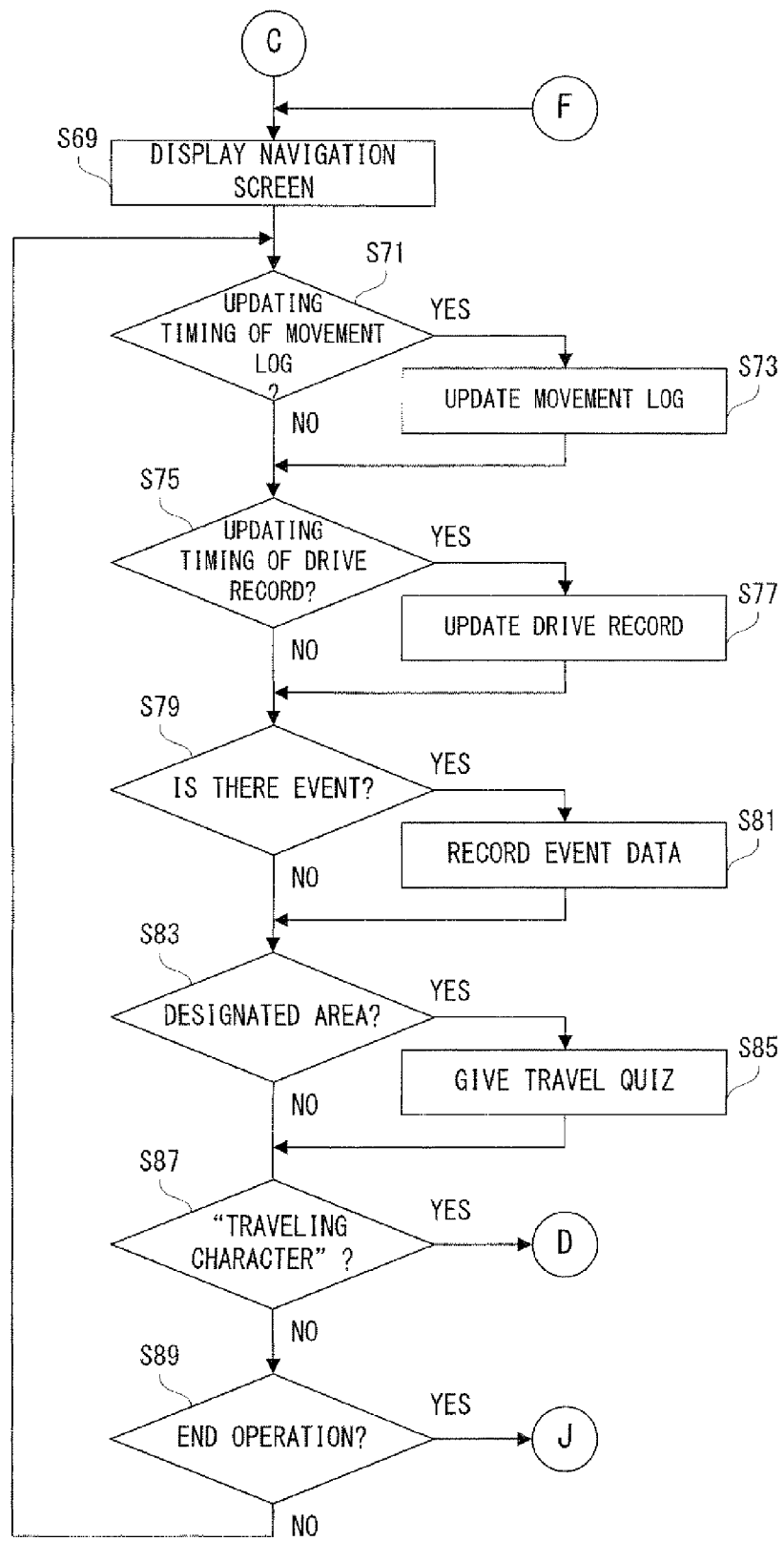
FIG. 22 is a flowchart showing another part of an operation by the CPU of the game apparatus.

Referring to FIG. 22, in the step S69, a navigation screen as shown in FIG. 29(C) is displayed on the LCD 12. The navigation screen is a screen uniquely created on the basis of the map information provided from the car navigation 112, and includes a map in the vicinity of the current position (black arrow) of the vehicle 114, and the button B6 indicating "TRVELING CHARACTER". Then, occurrence of the various events is waited through steps S71, S75, S79, S83, S87 and S89.

Specifically, in the first step S71, it is determined whether or not an updating timing of the movement log has come, and if "NO", the process proceeds to the step S75. If "YES" in the step S71, the movement log (see FIG. 17) stored in the movement log area 90 is updated on the basis of an output from the car navigation 112. Here, the updating trimming of the movement log is decided to be once per 5 seconds in advance in view of the amount of data and accuracy of the movement log. The updating cycle may also adequately be changeable in the initial setting not shown. After completion of the updating, the process proceeds to the step S75.

In the step S75, it is determined whether or not an updating timing of the drive record has come, and if "NO", the process proceeds to the step S79. If "YES" in the step S75, the drive data (see FIG. 18(A)) stored in the drive data area 92 is updated on the basis of an output from the car navigation 112 and/or the information of the game apparatus 10 itself in the step S77. Here, the update timing of the drive record is decided in advance to be once per 5 minutes, for example. The renewal cycle may also adequately be changeable in the initial setting not shown. After updating, the process proceeds to the step S79.

In the step S79, it is determined whether or not the event as illustrated in FIG. 18(B) occurs, and if "NO", the process proceeds to the step S83. If "YES" in the step S79, the category and the element of the event are specified on the basis of an output from the car navigation 112 and/or the information of the game apparatus 10 itself and recorded in the event recording area 94. Here, the recording content of the event recording area 94 is reflected on the drive data for updating of the drive record in the aforementioned step S77, for example, as a unit of event during five minutes. After completion of recording, the process proceeds to the step S83.

In the step S83, it is determined whether or not the current position indicated by the position information from the car navigation 112 is included in the area indicated by the designated area information attached to the travel quiz, and if "NO", the process proceeds to the step S87. If "YES" in the step S83, a relevant travel quiz (local area quiz) is given through the LCD 14 and/or the speaker 43 in a step S85. After completion of giving the quiz, the process proceeds to the step S87.

In the step S87, it is determined whether or not the button B6 is pushed on the navigation screen, that is, whether or not the "TRVELING CHARACTER" is designated, and if "NO", the process proceeds to the step S89. If "YES" in the step S87, the processing is branched to the step S91 (described later).

In the step S89, it is determined whether or not an end operation is performed, and if "NO", the process returns to the step S71 to repeat the aforementioned processing. If "YES" in the step S89, the process returns to the step S1.

Figure 23:
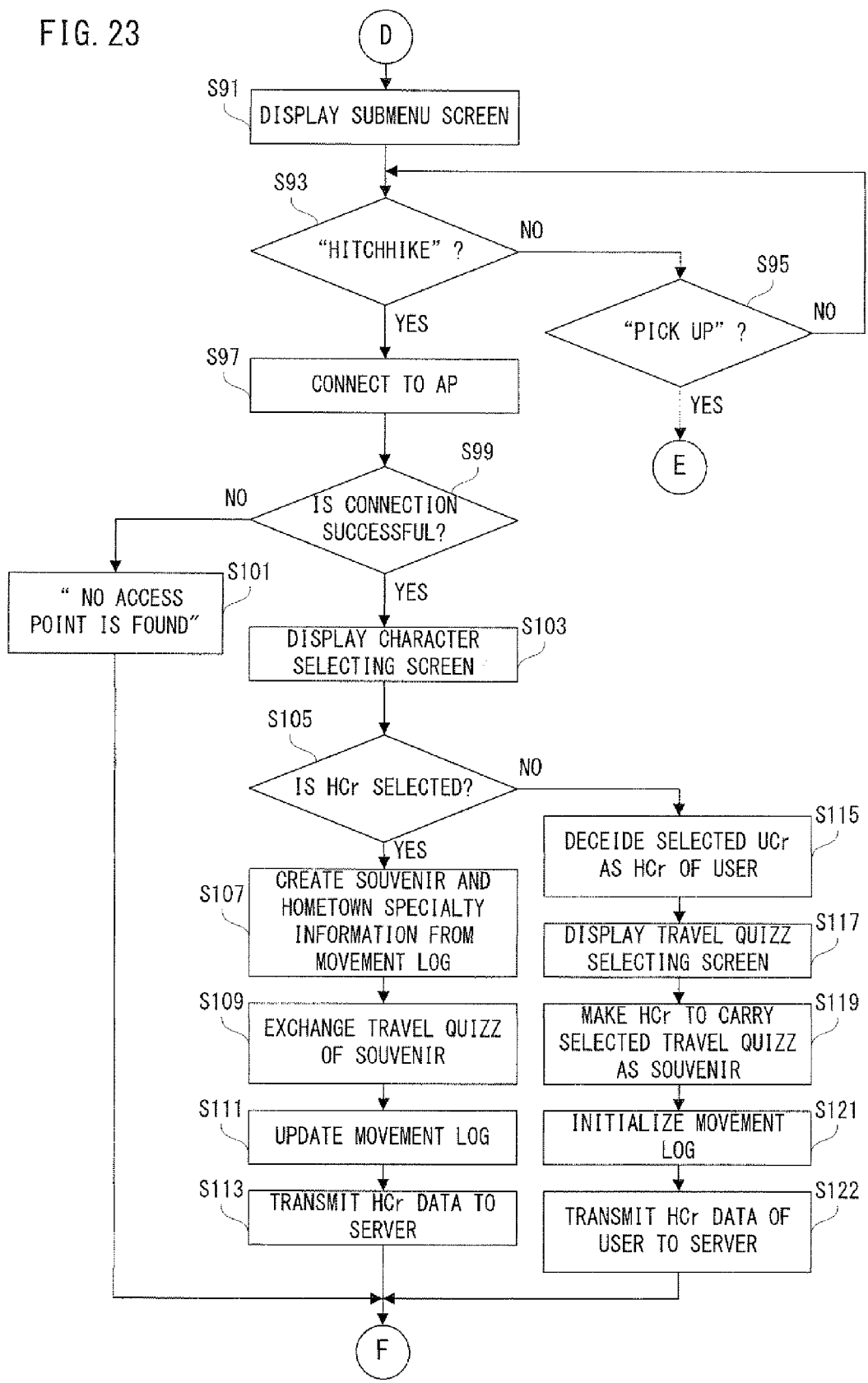
FIG. 23 is a flowchart showing a still another part of the operation by the CPU of the game apparatus.

Referring to FIG. 23, in a step S91, a submenu screen as shown in FIG. 29(D) is displayed on the LCD 12. The submenu screen includes a button B7 indicating "HITCHHIKE" and a button B8 indicating "PICKUP". Then, through the steps in steps S93 and S95, a push of any one of the buttons is waited. When the button B7 is pushed, "YES" is determined in the step S93, that is, it is determined that the "HITCHHIKE" is designated, and the process proceeds to a step S97. On the other hand, when the button B8 is pushed, it is determined that "YES", that is, it is determined that the "PICKUP" is designated in the step S95, and the process proceeds to a step S123 (described later).

In the step S97, a connection is made with the nearest AP via the Wi-Fi communications, and it is determined whether or not the connection is successful in a step S99. If "NO" here, an error message, "NO ACCESS POINT IS FOUND", for example, is displayed in a step S101, and then, the process returns to the step S69. If "YES" in the step S99, the process proceeds to a step S103 to display a character selecting screen not shown on the LCD 12 to determine whether or not the HCr is selected in a step S105. If "YES" in the step S105, processing from steps S107 to S113 is performed in order to make the selected HCr, that is, the other HCr which hitches a ride gets off at the AP. If "NO" in the step S105, processing from steps S115 to S122 is performed in order to make the selected character, that is, the own UCr (FCr may be appropriate) start off from the AP as a hitchhiker.

More specifically, in a case that the other's HCr is made to get off, souvenir and hometown specialty information is created from the movement log described in the HCr data (see FIG. 16(B)) of the HCr data area 88 in the step S107. This makes it possible to display the souvenir and hometown specialty of the local area where the other's HCr has traveled by hitchhike. Next, in the step S109, the travel quiz carried by the HCr, that is, the adequate travel quiz described in the HCr data and the travel quiz carried by the own character, that is, the adequate travel quiz stored in the travel quiz data area 96 (see FIG. 13(B)) are exchanged with each other. Next, in the step S111, the movement log described in the HCr data is updated. More specifically, the ID of the AP to which a connection is currently made and the current time (time when the HCr character gets off) are additionally written to the movement log. Then, the process proceeds to the step S113 to transmit the HCr data to the server 102. After transmitting, the process returns to the step S69.

On the other hand, in a case that the UCr of the user himself or herself is made to travel by hitchhike, the selected UCr is decided as an HCr of the user in the first step S115. Next, in the step S117, a travel quiz selecting screen not shown is displayed on the LCD 12, and in the step S119, the selected travel quiz is made to carry by the HCr of the user as a souvenir. That is, the selected souvenir travel quiz data is attached to the HCr data of the user that is to be transmitted from now. Next, in the step S121, the movement log of the HCr data is initialized. Then, the process proceeds to the step S122 to transmit the HCr data of the user to the server 102. After transmission, the process returns to the step S69.

Figure 24:
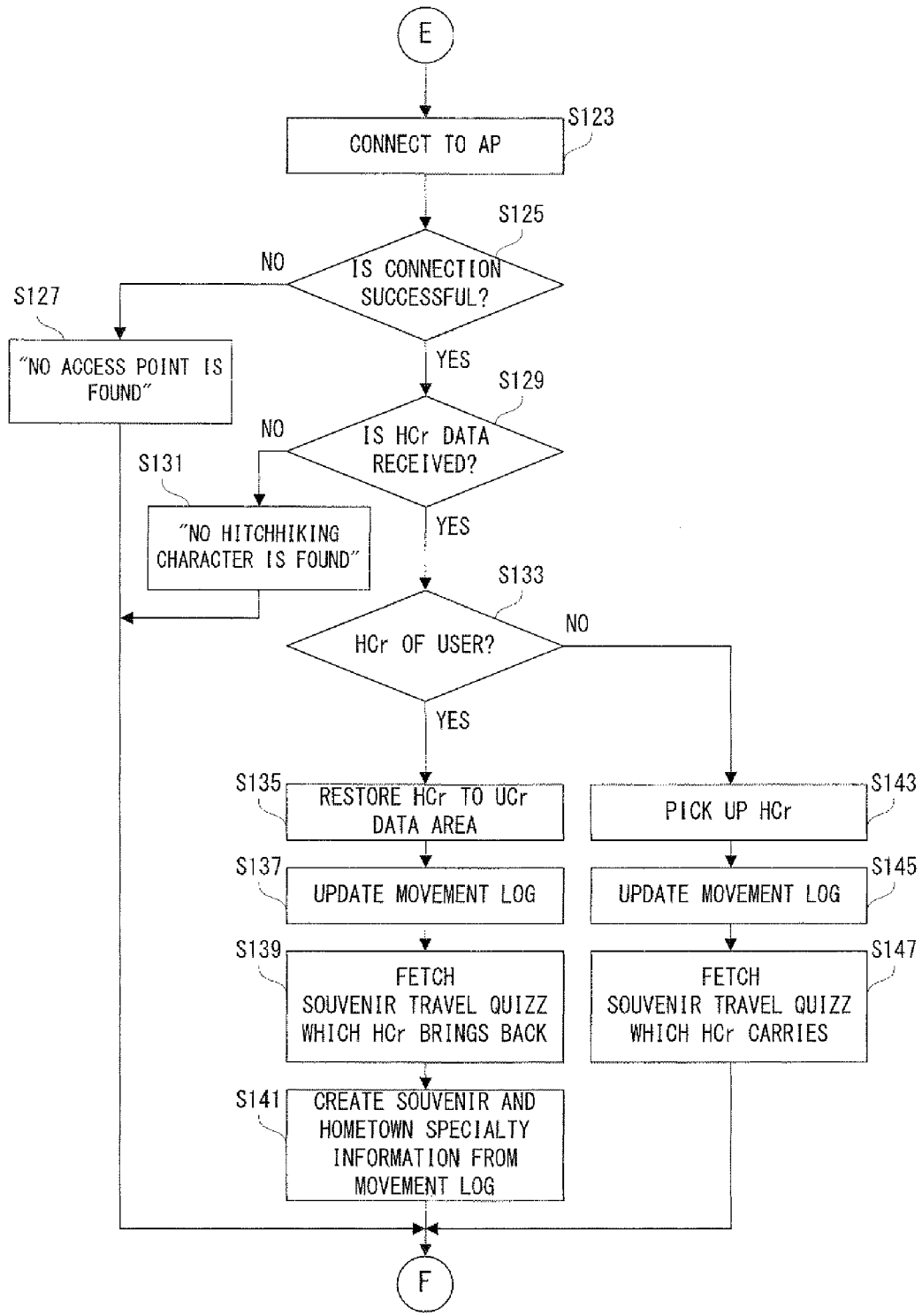
FIG. 24 is a flowchart showing a further part of the operation by the CPU of the game apparatus.

The processing in a case that the "PICKUP" is designated on the submenu screen is as follows. Referring to FIG. 24, in a step S123, a connection is made with the nearest AP via the Wi-Fi communications, and it is determined whether or not the connection is successful in a step S125. If "NO" here, an error message "NO ACCESS POINT IS FOUND", for example, is displayed in a step S127, and the process returns to the step S69. If "YES" in the step S125, the process proceeds to a step S129 to determine whether or not the HCr data is received. If "NO" here, an error message "NO HITCHHIKING CHARACTER IS FOUND", for example, is displayed in a step S131, and the process returns to the step S69.

If "YES" in the step S129, the process proceeds to a step S133 to further determine whether or not the received HCr data is the HCr data of the user. If "YES" in the step S133, processing from steps S135 to S141 is performed in order to accept the own HCr which goes back. If "NO" in the step S133, the processing from steps S143 to S147 is performed in order to pick up the selected character, that is, the other's HCr.

More specifically, in a case that the own HCr is accepted, the received HCr data is first restored to the UCr data area 84 as the own UCr in the step S135. Next, in the step S137, the movement log described in the HCr data is updated. More specifically, the ID of the AP to which a connection is currently made and the current time (time when the HCr character gets on) are additionally written to the movement log. Next, in the step S139, the souvenir travel quiz which the HCr brings back is fetched in the travel quiz data area 96. Next, in the step S141, souvenir and hometown specialty information is created from the movement log described in the HCr data. Thus, this makes it possible to display the souvenir and hometown specialty of the local area where the own HCr has traveled by hitchhike. After completion of creating, the process returns to the step S69.

On the other hand, in a case that the other's HCr is picked up, the HCr is first picked up in the step S143. That is, the received HCr data is written to the HCr data area 88. Next, in the step S145, the movement log described in the HCr data is updated. More specifically, the ID of the AP to which a connection is currently made and the current time (time when the HCr character gets on) are additionally written to the movement log. Next, in the step S147, the souvenir travel quiz carried by the HCr is fetched in the travel quiz data area 96. After fetching, the process returns to the step S69.

Figure 25:
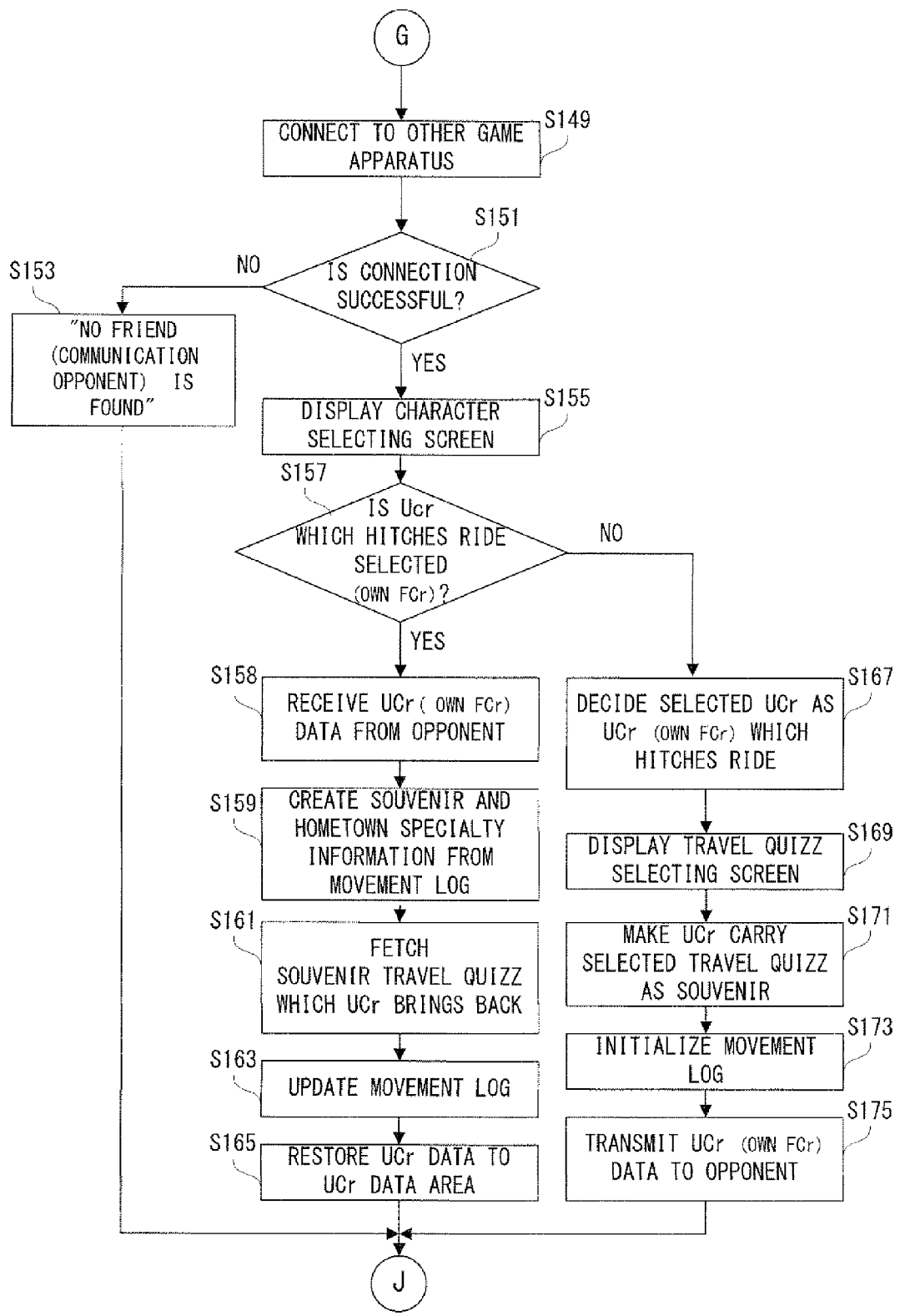
FIG. 25 is a flowchart showing a still further part of the operation by the CPU of the game apparatus.

The processing in a case that the button B3 is pushed on the main menu screen, that is, in a case that the "HITCH RIDE WITH FRIEND'S DRIVE" is designated is as follows. Referring to FIG. 25, in a step S149, a connection is performed with the other game apparatus 10Q through the local communications, and it is determined whether or not the connection is successful in a step S151, if "NO" here, an error message "NO FRIEND (communication opponent) IS FOUND" is displayed in a step S153, and then, the process returns to the step S41. If "YES" in the step S151, a character selecting screen not shown is displayed on the LCD 12 in a step S155. Then, in a step S157, it is determined whether or not the UCr which hitches a ride with the vehicle 114Q as an FCr of the user is selected. If "YES" in the step S157, processing from steps S158 to S165 is performed in order to accept the selected UCr, that is, the own FCr which has hitched a ride with the other vehicle 114Q. If "NO" in the step S157, processing from steps S167 to S175 is performed in order to make the selected UCr hitch a ride with the other vehicle 114Q as an own FCr.

Specifically, in a case that the own FCr is accepted, the UCr data of the UCr which is made to hitch a ride is received from the opponent, that is, the other game apparatus 10Q in the step S158. Next, in the step S159, the souvenir and hometown specialty information is created from the movement log described in the received UCr data. This makes it possible to display the souvenir and hometown specialty of the local area where the UCr, that is, the own FCr which hitches a ride with the other vehicle 114Q and visits. Next, in the step S161, the souvenir travel quiz which the own FCr brings back is fetched in the travel quiz data area 96. Next, in the step S163, the movement log described in the received UCr data is updated. More specifically, out of the movement logs stored in the movement log area 90, the movement logs before the UCr drives with the friend are added to the movement log. Then, the process proceeds to the step S165 to restore the received UCr data to the UCr data area 84. After restoring, the process returns to the step S41.

On the other hand, in a case that the own FCr hitches a drive with the other vehicle 114Q, the selected UCr is first decided as an UCr which hitches a drive, that is, the own FCr in the step S167. Next, in the step S169, a travel quiz selecting screen not shown is displayed on the LCD 12, and in the step S171, the UCr is made to carry the selected travel quiz as a souvenir. That is, the selected souvenir travel quiz data is attached to the UCr data which is to be transmitted. Next, in the step S173, the movement log of the UCr data is initialized. Then, the process proceeds to the step S175 to transmit the UCr data, that is, the own FCr to the opponent, that is, the other game apparatus 10Q. After completion of the transmission, the process returns to the step S41.

Figure 26:
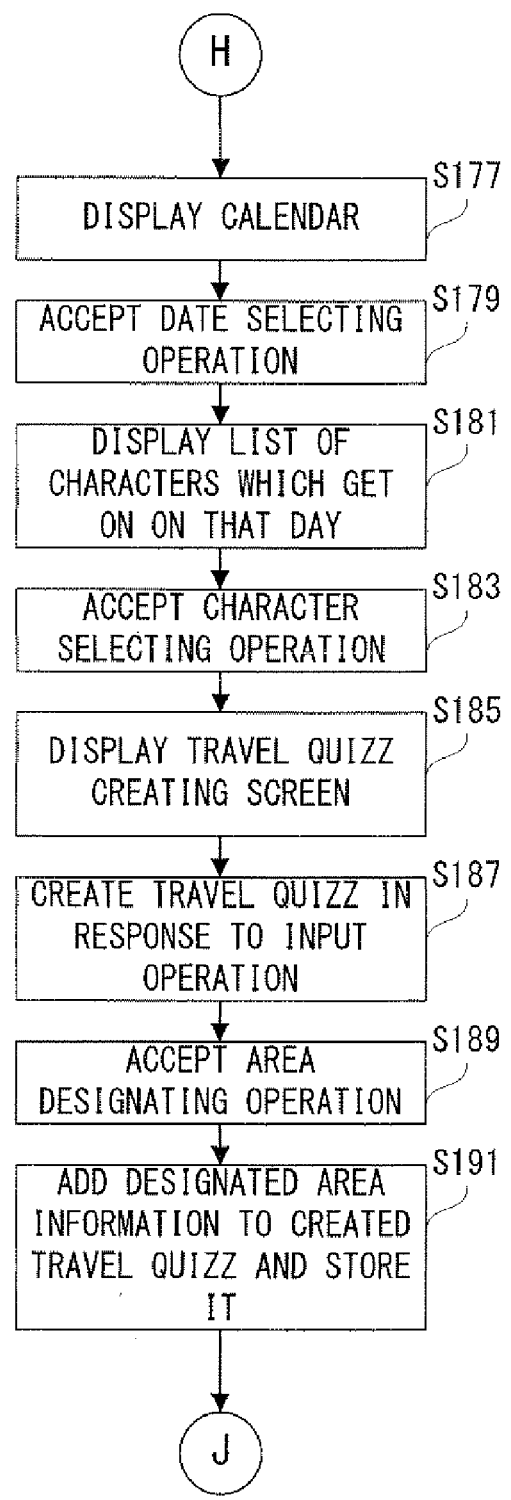
FIG. 26 is a flowchart showing another part of the operation by the CPU of the game apparatus.

The processing in a case that the button B4 is pushed, that is, in a case that the "TRAVEL QUIZ", on the main menu screen is designated is as follows. Referring to FIG. 26, in a step S177, a calendar is first displayed, in a next step S179, a date selecting operation is accepted, and in a next step S181, a list of characters which get on that day is displayed. These processing is based on the drive data shown in FIG. 18(A).

Then, in a step S183, a character selecting operation for selecting a character being a questioner is accepted, and in a step S185, a travel quiz creating screen as shown in FIG. 10 is displayed. On the travel quiz creating screen, the selected character appears as a questioner, and a message "THINK ABOUT QUIZ!" is offered. In a next step S187, travel quiz data is created in accordance with a letter input operation to the touch panel 28. In the piece of paper on the LCD 12, letters indicating the quiz of the created travel quiz is described.

Thereafter, in a step S189, an area designating operation for designating an area for giving the travel quiz thus created is accepted. Then, in a step S191, designated area information (and character ID of the questioner) is added to the travel quiz data, and the travel quiz data with the designated area is stored in the quiz data area 96. After the storage, the process returns to the step S1. The aforementioned travel quiz giving processing in the step S85 is executed in the area associated with the travel quiz with reference to the travel quiz data attached with designated area information.

Figure 27:
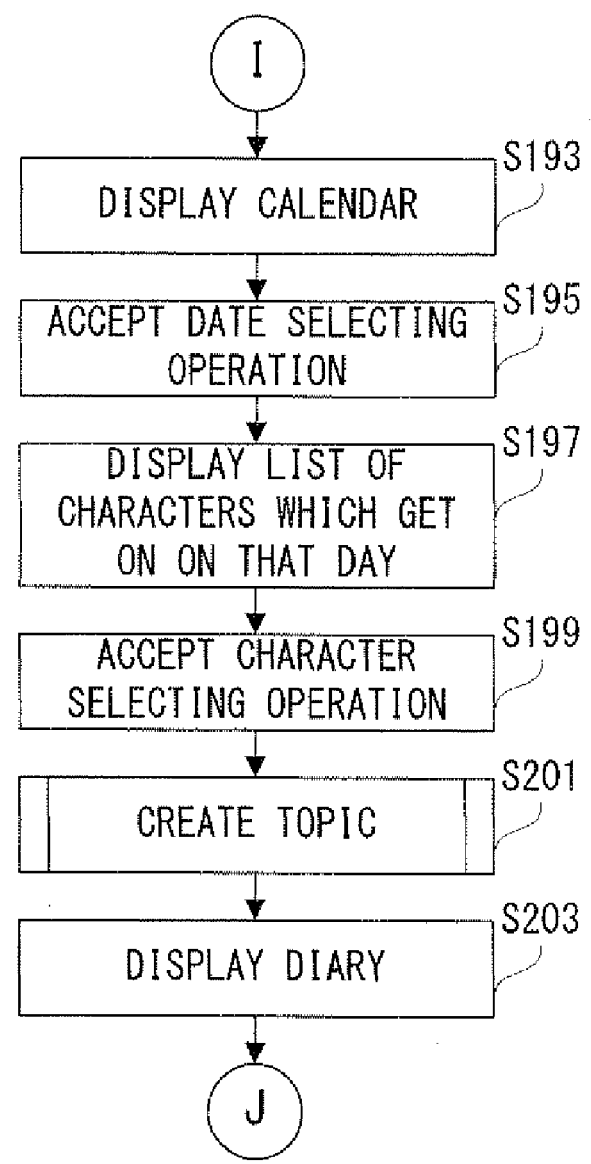
FIG. 27 is a flowchart showing a still another part of the operation by the CPU of the game apparatus.

The processing in a case that the button B5 is pushed, that is, in a case that the "CHARACTER DIARY" is designated, on the main menu screen is as follows. Referring to FIG. 27, in a step S193, a calendar is first displayed, and in a next step S195, a date selecting operation is accepted, and in a next step S197, a list of characters which get on that day is displayed.

Thereafter, in a step S199, a character selecting operation for selecting a character (UCr 4 of the sister, for example) being a creator is accepted, and in a next step S201, a topic is created on the basis of the drive data as shown in FIG. 18 (described later).

Then, in a step S203, the created topic is displayed in a form of the character diary as shown in FIG. 9, for example. In the character diary, topics, such as the date of the drive (Aug. 18, 2010), the destination (Mt. Fuji), the friend who is picked up (Satchan), and the event during the drive (traffic jam, quiz) are described, and the image of the sister (UCr 4) being a creator and the image photographed during driving (photograph of the landscape of Mt. Fuji) are also attached.

Figure 28:
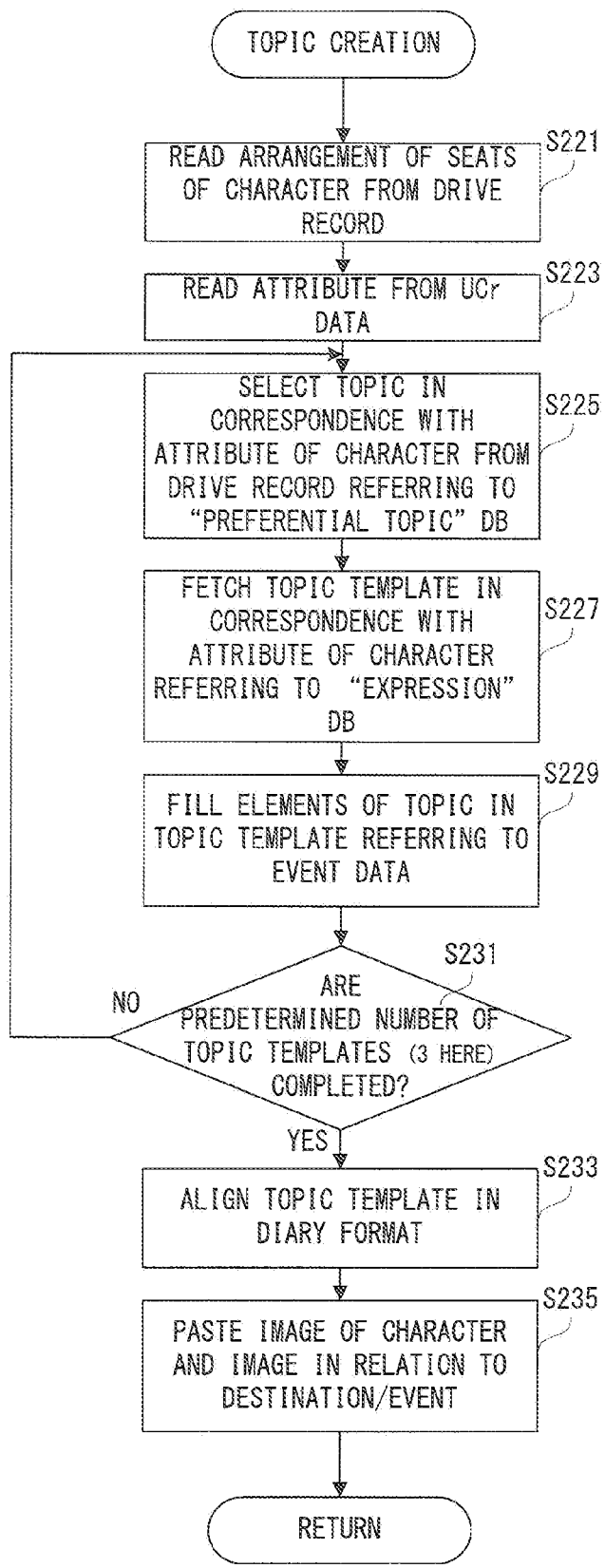
FIG. 28 is a flowchart showing a further part of the operation by the CPU of the game apparatus.

The topic creating processing in the aforementioned step S201 is specifically executed according to a flowchart in FIG. 28. First, the arrangement of the seats of the characters is read from the drive data (see FIG. 18(A)) in a step S221, and the attribute of the character selected in the step S199 is read from the UCr data (see FIG. 16(A)) in a next step S223.

Thereafter, in a step S225, a topic in correspondence with the attribute of the character is selected from the drive data on the basis of the "preferential topic" DB 82b (see FIG. 15). For example, in a case that the character is the UCr 4 (sister), the "destination and game" is fetched as a preferential topic corresponding to the "children" from the "preferential topic" DB 82b. In a next step S227, the topic template corresponding to the attribute of the character is fetched from a plurality of topic templates not shown (stored in the memory for saved data 52, for example) which are prepared in advance on the basis of the "expression" DB 82a (see FIG. 14). For example, in a case that the character is the UCr 4 (sister), "だったよ" (Japanese Hiragana (Dattayo): frank and informative expression) and "しちゃった" (Japanese Hiragana (Shichatta): frank and informative expression) are fetched from the "preferential topic" DB 82b as expressions corresponding to the "brother/sister". As topic templates, "Today, I come out to see . . . with . . . ", "It takes . . . hours", "We talks about . . . during traveling", etc. are fetched.

Thereafter, in a step S229, the elements of the selected topic are filled in the fetched topic template. The specific elements are recorded as events in the drive data (see FIG. 18(A)), and the specific elements (see FIG. 18(B)) relevant to the selected topic are fetched therefrom to thereby fill in the topic templates. In a next step S231, it is determined whether or not filling in a predetermined number (3, for example) of topic templates is completed, and if "NO", the process returns to the step S225 to repeat the processing similar to the above description.

If "YES" in the step S231, the process proceeds to a step S233 to align these completed topic templates (3, for example) in a predetermined format on a page of the diary (memory area not shown corresponding thereto). Then, in a step S235, the image of the character and the image in relation to the destination and the event are pasted at the blank of the page. The images in relation to the destination and the event are obtained from the memory card 38a, etc. on the basis of the date and time when the images are photographed by the camera. Thus, the character diary as shown in FIG. 9 is completed. Then, the process returns to the flowchart (see FIG. 27) at an upper level.

As understood from the above description, in this embodiment, the game apparatus 10 (10P) includes the CPU 42 and the main memory 48. The main memory 48 stores a first character (user characters UCr 1 to UCr 4), is capable of storing a second character (friend character FCr), and stores a first movement history being brought into association with the first character. The CPU 42 obtains position information indicating a position where the game apparatus 10 (10P) exists (S67), updates the first movement history on the basis of the position information (S73), receives the second character and a second movement history being brought into association with the second character from the other game apparatus 10 (10Q, 10R, . . . ) (S59), and performs processing, such as predetermined processing, such as entering a diary and giving a quiz by the character on the basis of at least one of the first character and the second character, and at least one of the first movement history and the second movement history (S177 to S191, S193 to S203).

Thus, without being restricted to the first character and the first movement history that are stored in the game apparatus 10 (10P) itself, a predetermined processing is performed by utilizing the second character and the second movement history which are received from the other game apparatus 10 (10Q, 10R, . . . ), and whereby, it is possible to make the user feel a change beyond the moving range of the user himself or herself.

Furthermore, in this embodiment, the main memory 48 of each game apparatus 10 (10P, 10Q, . . . ) is capable of further storing a third character (hitchhiker character HCr). The server 102 includes the CPU 104 and the memory 106. The memory 106 stores the third character and a third movement history which is being brought into association with the third character. The CPU 104, when the game apparatus 10 (10P) storing the third character is connected to the network 110 at an arbitrary position, stores the third position information indicating the connected position by bringing it into association with the third character (S9), updates the third movement history on the basis of the third position information (S10), and, when the game apparatus 10 (10Q) not storing the third character is connected to the network 110 at a position indicated by the third position information, transmits the third character and the third movement history to the game apparatus 10 (10Q) (S19,S25). The CPU 42 of the game apparatus 10 (10Q) receives the third character and the third movement history from the server 102 (S143), and performs the predetermined processing (S177 to S191, S193 to S203) on the basis of at least one of the first to third characters and at least one of the first to third moving histories.

Thus, without being restricted to the first character and the first movement history which the game apparatus 10 (10P) itself stores, by utilizing the second character and the second movement history which are received from the other game apparatus 10 (10Q, 10R, . . . ) and the third character and the third movement history which are received from the server 110 as well, the predetermined processing is performed, whereby, it is possible to make the user further feel a change beyond the moving range of the user himself or herself.

Additionally, in this embodiment, by using the movement history, the character may write a diary, give a quiz, offers a souvenir and hometown specialty, but in another embodiment, by using the movement history, the character may perform the game and conduct questionnaire. Furthermore, in addition to the quiz, a blog is created, and the blog may be offered at the designated area in addition to the quiz. The souvenir and hometown specialty may be displayed when the UCr or the HCr return, or stored and displayed at an arbitrary timing.

In addition, the pickup of the HCr may be executed according to an operation on the side of the game apparatus 10 in this embodiment (specifically, when the "PICKUP" is selected on the submenu screen), but this may automatically be executed by a control on the side of the server 102 when the game apparatus 10 is connected to the access point.

Furthermore, the "category" of the event data (see FIG. 18(B)) may include various categories other than the "base" and the "navigation conjunction".

Additionally, the "TRVELING CHARACTER" program 80a may be a part of the "DRIVE WITH CHARACTER" program 80 in this embodiment, but may be an independent program.

In addition, the command for forcibly returning the HCr may be transmitted from the console-type game apparatus, the PC, or the like.

Additionally, the current position of the HCr may be confirmed by the game apparatus, the console-type game apparatus, the PC, or the like.

Furthermore, for fetching the position information, the car navigation is not necessarily used, and a portable terminal with GPS receiver, for example, may be used. Accordingly, example embodiments of the present invention can be applied to going by public transport, bicycle, and on foot without being restricted to the driving.

Moreover, the character image and/or the attribute may be included in the FCr data (see FIG. 16(B)) and the HCr data (see FIG. 16(C)).

Furthermore, the movement log based on the GPS may be carried by the HCr. This makes it possible for the HCr to write the diary in detail.

Furthermore, the exchange of the third character (HCr) can be made by direct communications between the game apparatuses 10P, 10Q, . . . (short distance wireless communication, for example) without using the server 102. In this case, when each game apparatus 10P, 10Q, . . . is connected with another game apparatus not including the third character in a state that the third character is stored by short distance wireless communications, the CPU 42 updates the movement log of the third character, and transmits and receives the updated movement log together with the third character by the short distance wireless communications. Furthermore, the dealing of the third character is similar to that of the second character (FCr).

In the above description, the description is made on the game system 100, but the first aspect of example embodiments of this invention can be applied to a information processing system including a plurality of information processing apparatuses, and making communications between the first and second information processing apparatuses by various short distance wireless communications or wire communications, or via a portable storage medium. Furthermore, the second aspect of example embodiments of this invention can be applied to an information processing system further including a server, and making Wi-Fi communications between each of the information processing apparatuses and the server.

Although example embodiments of the present invention have been described and illustrated in detail, it is clearly understood that the same is by way of illustration and example only and is not to be taken by way of limitation, the spirit and scope of the present invention being limited only by the terms of the appended claims.

Furthermore, it should be understood that overall the embodiment of the present invention, a representation of a singular form also includes a concept of the plural form unless otherwise stated. Accordingly, an article or an adjective in the singular (for example, "a", "an", "the", etc. for English) also includes a concept of the plural form unless otherwise stated.

What is claimed is:

1. A non-transitory storage medium storing an information processing program to be executed by a computer of an information processing apparatus which performs processing based on position information, wherein said information processing program causes said computer to provide functionality comprising:
   a data receiver which receives a character and a movement history being brought into association with said character from another information processing apparatus;
   a character storage which is capable of storing at least one character;
   a movement history storage which stores a movement history being brought into association with the character stored in said character storage;
   a position information acquirer which acquires position information indicating a position in which said information processing apparatus itself exists;
   a movement history updater which updates said movement history on the basis of said position information; and
   a processor which performs predetermined processing on the basis of said character and said movement history.

2. A non-transitory storage medium storing an information processing program according to claim 1, wherein said information processing program causes said computer to provide further functionality comprising:
   a data transmitter which transmits said character and the movement history being brought into association with said character to the other information processing apparatus.

3. A non-transitory storage medium storing an information processing program according to claim 1, wherein
   said character storage stores a first character, and is capable of storing a second character,
   said data receiver receives said second character and a second movement history being brought into association with said second character from said other information processing apparatus,
   said movement history storage stores a first movement history being brought into association with the first character stored in said character storage, and said processor performs said predetermined processing on the basis of at least one of said first character and said second character, and at least one of said first movement history and said second movement history.

4. A non-transitory storage medium storing an information processing program according to claim 3, wherein
said processor performs said predetermined processing on the basis of the first character stored in said character storage, the second character received by said data receiver, and said first movement history.

5. A non-transitory storage medium storing an information processing program according to claim 1, wherein
said movement history includes position information of a position to which said information processing apparatus itself moves and time information of a time when a movement to said position is made, and
said processor performs said predetermined processing on the basis of said position information and said time information.

6. A non transitory storage medium storing an information processing program according to claim 2, wherein
said data receiver directly receives from the other information processing apparatus by short distance communications, and
said data transmitter directly transmits to the other information processing apparatus by the short distance communications.

7. A non-transitory storage medium storing an information processing program according to claim 1, wherein
said position information acquirer directly acquires said position information from equipment having a GPS function by short distance communications.

8. A non-transitory storage medium storing an information processing program according to claim 2, wherein said information processing program causes said computer to provide further functionality comprising:
a character selector which makes a user select an arbitrary character from the characters stored in said character storage, wherein
said data transmitter transmits the character selected by said character selector and the movement history being brought into association with said character to the other information processing apparatus.

9. A non-transitory storage medium storing an information processing program according to claim 1, wherein
said processor displays on a displayer information on a route along which said information processing apparatus itself moves on the basis of the movement history stored in said movement history storage.

10. A non-transitory storage medium storing an information processing program according to claim 9, wherein
said processor changes at least one of a content and an expression of the information to be displayed on said display on the basis of an attribute set for each character.

11. An information processing apparatus performing processing based on position information, comprising:
a data receiver which receives a character and a movement history being brought into association with said character from another information processing apparatus;
a character storage which is capable of storing at least one character;
a movement history storage which stores a movement history being brought into association with the character stored in said character storage;
a position information acquirer which acquires position information indicating a position in which said information processing apparatus itself exists;
a movement history updater which updates said movement history on the basis of said position information; and
a processor which performs predetermined processing on the basis of said character and said movement history.

12. An information processing method to be executed by an information processing apparatus performing processing based on position information, wherein
said information processing apparatus includes a character storage which is capable of storing at least one character, and a movement history storage which stores a movement history being brought into association with the character stored in said character storage, comprising:
a data receiving step of receiving a character and a movement history being brought into association with said character from another information processing apparatus;
a position information acquiring step of acquiring position information indicating a position in which said information processing apparatus itself exists;
a movement history updating step of updating said movement history on the basis of said position information; and
a processing step of performing predetermined processing on the basis of said character and said movement history.

13. An information processing system including a plurality of information processing apparatuses each of which performs processing based on position information, wherein
each of said information processing apparatuses, comprises:
a data receiver which receives a character and a movement history being brought into association with said character from another information processing apparatus;
a character storage which is capable of storing at least one character;
a movement history storage which stores a movement history being brought into association with the character stored in said character storage;
a position information acquirer which acquires position information indicating a position in which said information processing apparatus itself exists;
a movement history updater which updates said movement history on the basis of said position information; and
a processor which performs predetermined processing on the basis of said character and said movement history.

14. An information processing system according to claim 13, wherein
said character storage stores a first character, and is capable of storing a second character,
said data receiver receives said second character and a second movement history being brought into association with said second character from said other information processing apparatus, and
said processor performs said predetermined processing on the basis of at least one of said first character and said second character, and at least one of said first movement history and said second movement history.

15. An information processing system according to claim 14, further including
a server which performs communications with each of said information processing apparatuses via a network, wherein
said character storage is capable of further storing a third character, said server further comprises:
- a third movement history storage which stores said third character and a third movement history being brought into association with said third character;
- a third position information storage which, when an information processing apparatus storing said third character is connected to said network in an arbitrary position, stores third position information indicating a connected position by bringing it into association with said third character;
- a third movement history updater which updates said third movement history on the basis of said third position information; and
- a first data transmitter which, when an information processing apparatus not storing said third character is connected to said network at a position indicated by said third position information, transmits said third character and said third movement history to said information processing apparatus, and each of said information processing apparatuses further comprises
- a second data receiver which receives said third character and said third movement history from said server, wherein said processor performs said predetermined processing on the basis of at least one of said first to third characters and at least one of said first to third moving histories.

16. An information processing system according to claim 14, wherein
said character storage is further capable of storing a third character,
each of said information processing apparatuses comprises:
- a third movement history storage which stores said third character and a third movement history being brought into association with said third character;
- a third movement history updater which, when a connection is made with another information processing apparatus not storing said third character by short distance wireless communications in a state that said third character is stored, updates said third movement history; and
- a data transmitter/receiver which transmits and receives the third movement history updated by said third movement history updater with said third character by said short distance wireless communications, wherein said processor performs said predetermined processing on the basis of at least one of said first to third characters and at least one of said first to third moving histories.

17. An information processing system including a plurality of information processing apparatuses each of which performs processing based on position information and a server which makes communications between said respective information processing apparatuses via a network, wherein
each of said information processing apparatuses comprises:
- a character storage which stores a first character, and is capable of storing a second character;
- a movement history storage which stores a movement history being brought into association with the character stored in said character storage;
- a first information acquirer which acquires position information indicating a position in which said information processing apparatus itself exists; and
- a first movement history updater which updates said movement history on the basis of said first position information, said server comprises:
- a character movement history storage which stores said second character and a second movement history being brought into association with said second character;
- a second position information acquirer which, when an information processing apparatus storing said second character is connected to said network in an arbitrary position, acquires second position information indicating said connected position;
- a second movement history updater which updates said second movement history on the basis of said second position information; and
- a first data transmitter which, when an information processing apparatus not storing said second character is connected to said network in a position indicated by said second movement history, transmits said second character and said second movement history to said information processing apparatus, and each of said information processing apparatuses further comprises:
- a first data receiver which receives said second character and said second movement history from said server; and
- a processor which performs predetermined processing on the basis of at least one of said first character and said second character, and at least one of said first movement history and said second movement history.

18. An information processing system according to claim 17, wherein
each of said information processing apparatuses further comprises
- a second data transmitter which sends back the second character received by said first data receiver to said server, and said server further comprises
- a second data receiver which receives the second character sent back by said second data transmitter.

19. An information processing system according to claim 17, wherein
said network is provided with a plurality of access points,
each of said information processing apparatuses further comprises:
- a connector which connects to the nearest access point out of said plurality of access points; and said second position information acquirer acquires information indicating a position of the access point to which said connector is connected as said second position information.

20. An information processing system according to claim 19, wherein
said first movement history includes position information of a position to which each of said information processing apparatus moves and time information of a time when a movement to said position is made,
said second movement history includes position information of a position of an access point to which each of said information processing apparatuses connects and time information when a connection is made to said position, and
said processor performs said predetermined processing on the basis of said position information and said time information.

21. An information processing system according to claim 20, wherein
said first data transmitter, in a case that a plurality of second characters are brought into association with the access point to which said connector connects, transmits to the second character having the oldest connection time to said access point.

22. An information processing system according to claim 19, wherein
each of said access points belongs to any one of a plurality of areas which are covered by said network, and
said first transmitter, in a case that a second character is not brought into association with the access point to which said connector connects, transmits to the second character which is brought into association with another access point belonging to the same area to which said access point belongs.

23. An information processing system according to claim 19, wherein
each of said information processing apparatuses further comprises
a third data transmitter which transmits said first character to said server, wherein
said second data receiver further receives the first character transmitted by each of said information processing apparatuses,
said server further comprises a fourth transmitter which, in a case that said first character is included in the access point to which the connector of each of said information processing apparatus connects, sends back said first character and the movement history that is brought into association with said first character to said information processing apparatus, and
each of said information processing apparatuses further comprises
a third data receiver which receives said first character and the movement history being brought into association with said first character from said server, and
said processor performs said predetermined processing on the basis of the first character and the movement history being brought into association with said first character which are received by said third data receiver.

24. An information processing system according to claim 23, wherein
each of said information processing apparatuses provide functionality comprising:
a character selector which makes a user select an arbitrary first character from the characters stored in said character storage, wherein
said third data transmitter transmits the first character selected by said character selector to said server.

25. An information processing system according to claim 23, wherein
said processor displays on a display information on a route along which said first character moves on the basis of the first character and the movement history being brought into association with said first character that are received by said third data receiver.

26. An information processing system according to claim 25, wherein
said processor changes at least one of a content and an expression of the information to be displayed on said display on the basis of an attribute set for each character.

27. A non-transitory storage medium storing an information processing program for an information processing system including a plurality of information processing apparatuses each of which performs processing based on position information, and a server which makes communications with each of said information processing apparatuses via a network, said information processing program causes a computer of each of said information processing apparatuses to provide functionality comprising:
a character storage which stores a first character, and is capable of storing a second character;
a movement history storage which stores a movement history being brought into association with the character stored in said character storage;
a first information acquirer which acquires position information indicating a position in which said information processing apparatus itself exists; and
a first movement history updater which updates said movement history on the basis of said first position information,
causes a computer of said server to provide functionality comprising:
a character movement history storage which stores said second character and a second movement history being brought into association with said second character;
a second position information acquirer which, when an information processing apparatus storing said second character is connected to said network in an arbitrary position, acquires second position information indicating said connected position;
a second movement history updater which updates said second movement history on the basis of said second position information; and
a first data transmitter which, when an information processing apparatus not storing said second character is connected to said network in a position indicated by said second movement history, transmits said second character and said second movement history to said information processing apparatus, and
causes the computer of each of said information processing apparatuses to provide further functionality comprising:
a first data receiver which receives said second character and said second movement history from said server; and
a processor which performs predetermined processing on the basis of at least one of said first character and said second character, and at least one of said first movement history and said second movement history.

28. An information processing method for an information processing system including a plurality of information processing apparatuses each of which performs processing based on position information, and a server which makes communications with each of said information processing apparatuses via a network, wherein
each of said information processing apparatuses includes a character storage which stores a first character and is capable of storing a second character, and a movement history storage which stores a movement history being brought into association with the character stored in said character storage,
including steps to be executed by each of said information processing apparatuses comprising:
a first information acquiring step of acquiring first position information indicating a position in which said information processing apparatus itself exists; and
a first movement history updating step of updating said movement history on the basis of said first position information, wherein
said server includes a character movement history storage which stores said second character and a second movement history being brought into association with said second character, including steps to be executed by said server comprising:
- a second position information acquiring step off, when an information processing apparatus storing said second character is connected to said network in an arbitrary position, acquiring second position information indicating said connected position;
- a second movement history updating step of updating said second movement history on the basis of said second position information; and
- a first data transmitting step off, when an information processing apparatus not storing said second character is connected to said network in a position indicated by said second movement history, transmitting said second character and said second movement history to said information processing apparatus, and including steps to be executed by each of said information processing apparatuses comprising:
a first data receiving step of receiving said second character and said second movement history from said server; and
a processing step of performing predetermined processing on the basis of at least one of said first character and said second character, and at least one of said first movement history and said second movement history.

29. An information processing apparatus performing processing based on position information and makes communications with a server via a network, comprising:
- a character storage which stores a first character, and is capable of storing a second character;
- a movement history storage which stores a movement history being brought into association with the character stored in said character storage;
- a first information acquirer which acquires position information indicating a position in which said information processing apparatus itself exists; and
- a first movement history updater which updates said movement history on the basis of said first position information,
- said server includes: a character movement history storage which stores said second character and a second movement history being brought into association with said second character; a second position information acquirer which, when an information processing apparatus storing said second character is connected to said network in an arbitrary position, acquires second position information indicating said connected position; a second movement history updater which updates said second movement history on the basis of said second position information; and a first data transmitter which, when an information processing apparatus not storing said second character is connected to said network in a position indicated by said second movement history, transmits said second character and said second movement history to said information processing apparatus, and further comprising:
- a first data receiver which receives said second character and said second movement history from said server; and
- a processor which performs predetermined processing on the basis of at least one of said first character and said second character, and at least one of said first movement history and said second movement history.

30. A server making communications with a plurality of information processing apparatuses each of which performs processing based on position information via network, wherein
each of said information processing apparatuses includes: a character storage which stores a first character, and is capable of storing a second character; a movement history storage which stores a movement history being brought into association with the character stored in said character storage; a first information acquirer which acquires position information indicating a position in which said information processing apparatus itself exists; and a first movement history updater which updates said movement history on the basis of said first position information, comprising:
- a character movement history storage which stores said second character and a second movement history being brought into association with said second character;
- a second position information acquirer which, when an information processing apparatus storing said second character is connected to said network in an arbitrary position, acquires second position information indicating said connected position;
- a second movement history updater which updates said second movement history on the basis of said second position information; and
- a first data transmitter which, when an information processing apparatus not storing said second character is connected to said network in a position indicated by said second movement history, transmits said second character and said second movement history to said information processing apparatus, wherein
each of said information processing apparatuses further includes: a first data receiver which receives said second character and said second movement history from said server; and a processor which performs predetermined processing on the basis of at least one of said first character and said second character, and at least one of said first movement history and said second movement history.

* * * * *